US012304727B2

(12) United States Patent
Stiglic et al.

(10) Patent No.: US 12,304,727 B2
(45) Date of Patent: May 20, 2025

(54) THERMOPLASTIC FILMS AND BAGS WITH ENCAPSULATION-BASED DELAYED ODOR CONTROL AND METHODS OF MAKING THE SAME

(71) Applicant: THE GLAD PRODUCTS COMPANY, Oakland, CA (US)

(72) Inventors: Jeffrey S Stiglic, Willowbrook, IL (US); Dean A Ferracane, Willowbrook, IL (US); Jessica Greer, Willowbrook, IL (US); Scott O'Hara, Willowbrook, IL (US); Christopher G Anderson, Cincinnati, OH (US); Rajesh K Mishra, Cincinnati, OH (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 614 days.

(21) Appl. No.: 17/570,821

(22) Filed: Jan. 7, 2022

(65) Prior Publication Data

US 2022/0219889 A1 Jul. 14, 2022

Related U.S. Application Data

(60) Provisional application No. 63/136,294, filed on Jan. 12, 2021.

(51) Int. Cl.
*B65F 1/00* (2006.01)
*B31B 70/74* (2017.01)
(Continued)

(52) U.S. Cl.
CPC ............ *B65F 1/0026* (2013.01); *B31B 70/79* (2017.08); *B65D 33/004* (2013.01); *B65D 33/28* (2013.01);
(Continued)

(58) Field of Classification Search
CPC . B65D 33/004; B65F 1/0026; B65F 2210/129
See application file for complete search history.

(56) References Cited

U.S. PATENT DOCUMENTS

2006/0291756 A1* 12/2006 Thomas ............. B65D 33/2525
206/524.4
2017/0008261 A1 1/2017 Jean-Mary et al.
(Continued)

OTHER PUBLICATIONS

International Search Report & Written Opinion as received in PCT/US2022/011589 dated May 20, 2022.
(Continued)

*Primary Examiner* — Jes F Pascua
*Assistant Examiner* — Nina K Attel
(74) *Attorney, Agent, or Firm* — Keller Preece PLLC

(57) ABSTRACT

The present disclosure relates to a thermoplastic film that includes a plurality of ribs and a plurality of web areas that separate and connect the ribs. The thermoplastic film further includes an encapsulated odor control component that includes an odor control active encapsulated within a plurality of encapsulants. The encapsulants can be configured to delay a release of the odor-control active until activated. Further, the encapsulated odor control component can be applied across the plurality of ribs and the plurality of web areas, which can be configured to cause the encapsulants to activate in phases.

20 Claims, 14 Drawing Sheets

(51) Int. Cl.
*B65D 33/00* (2006.01)
*B65D 33/28* (2006.01)
*B31B 155/00* (2017.01)

(52) U.S. Cl.
CPC ..... *B31B 2155/00* (2017.08); *B65F 2210/129* (2013.01)

(56) References Cited

U.S. PATENT DOCUMENTS

| | | | |
|---|---|---|---|
| 2018/0118415 A1* | 5/2018 | Jean-Mary .......... | B31B 70/8134 |
| 2019/0200704 A1 | 7/2019 | Drey et al. | |
| 2020/0103383 A1 | 4/2020 | Ferracane et al. | |
| 2020/0115112 A1 | 4/2020 | Jean-Mary et al. | |
| 2020/0262172 A1 | 8/2020 | Tucker et al. | |
| 2020/0299059 A1 | 9/2020 | Cobler | |

OTHER PUBLICATIONS

Examination Report as received in Canadian Application 3,206,850 dated Aug. 12, 2024.

* cited by examiner

THERMOPLASTIC FILMS AND BAGS WITH ENCAPSULATION-BASED DELAYED ODOR CONTROL AND METHODS OF MAKING THE SAME

CROSS-REFERENCE TO RELATED APPLICATIONS

This application claims priority to and the benefit of U.S. Provisional Patent Application No. 63/136,294, filed on Jan. 12, 2021, which is incorporated herein by reference in its entirety.

BACKGROUND

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

In regard to trash bags formed from thermoplastic films, responding to malodors from materials placed in trash bags (e.g., trash) is a significant concern. In particular, each article of trash placed into a trash bag may function as a source of malodor, and many articles of trash may produce detectably potent malodors. These potent malodors can spread within the trash bag and throughout a surrounding area, causing proximity to the trash bag to be undesirable. In some instances, the malodors emanating from the trash within a trash bag become objectionable enough that the user performs a compensating behavior, such as replacing the trash bag before it is full. Accordingly, the user does not receive the full benefit of the trash bag (e.g., is not able to fill the trash bag to capacity).

Some trash bag manufacturers may apply one or more odor control components (e.g., a fragrance or neutralizing component) to the trash bag to help mask, neutralize, or otherwise control the malodors produced by the trash within the trash bag. However, such trash bags typically have a limited supply of odor control component. Further, the odor control component that is applied to a trash bag is typically depleted before the user has finished using the bag. For example, manufacturers may apply an odor control component to a trash bag in a neat oil application that evaporates within the first one or two days of use. Accordingly, though the trash bag may initially be able to control malodors via the odor control application, its efficacy will fade over time, allowing for the malodors to increase in potency. In some instances, the neat oil application begins to evaporate soon after manufacture and/or while in the packaging material, leaving less odor control component available by the time the user purchases or utilizes the trash bag.

Accordingly, there are a number of considerations to be made in thermoplastic films and controlling malodors emanating from materials placed within the thermoplastic films.

SUMMARY

One or more embodiments of the present disclosure provide benefits and/or solve one or more of the foregoing or other problems in the art with flexible thermoplastic films and bags that include an encapsulated odor control component for delayed odor control. For example, in one or more embodiments, a thermoplastic film includes a plurality of ribs and web areas for flexible (e.g., elastic-like) manipulation. Further, the thermoplastic film includes an encapsulated odor control component. The encapsulated odor control component can include an odor-control active encapsulated within a plurality of encapsulants and can be configured to delay a release of the odor-control active so that it releases little, to no, odor-control active until activated (e.g., by a physical interaction applied to the thermoplastic film). In one or more embodiments, the thermoplastic film is further configured to cause the encapsulated odor control component to activate in phases.

One or more embodiments include a thermoplastic film comprising a plurality of ribs and a plurality of web areas. In particular, the plurality of web areas separates and connects ribs of the plurality of ribs and is out of plane with the ribs of the plurality of ribs so as to create recesses between adjacent ribs of the plurality of ribs. The thermoplastic film further comprises an encapsulated odor control component applied across the ribs and the plurality of web areas, the encapsulated odor control component comprising an odor-control active encapsulated within a plurality of encapsulants. In particular, the plurality of encapsulants are configured to delay a release of the odor-control active until activated. Further, the ribs and the plurality of web areas are configured to cause the plurality of encapsulants to activate in phases.

One or more further embodiments include a thermoplastic bag comprising a first sidewall and a second sidewall opposite the first sidewall and joined with the first sidewall along a first side edge, an opposite second side edge, and a bottom edge. At least the first sidewall or the second sidewall comprises a plurality of ribs and a plurality of web areas, the plurality of web areas separating and connecting ribs of the plurality of ribs, wherein the plurality of web areas is out of plane with the ribs of the plurality of ribs so as to create recesses between adjacent ribs of the plurality of ribs. The thermoplastic bag also includes an encapsulated odor control component applied across the ribs and the plurality of web areas, the encapsulated odor control component comprising an odor-control active encapsulated within a plurality of encapsulants. In particular, the plurality of encapsulants are configured to delay a release of the odor-control active until activated. Further, the ribs and the plurality of web areas are configured to cause the plurality of encapsulants to activate in phases.

Additionally, one or more embodiments include a method of manufacturing thermoplastic bags having delayed odor control. The method includes providing a thermoplastic film comprising a plurality of ribs and a plurality of web areas, the plurality of web areas separating and connecting ribs of the plurality of ribs, wherein the plurality of web areas is out of plane with the ribs of the plurality of ribs so as to create recesses between adjacent ribs of the plurality of ribs. The method further includes applying an encapsulated odor control component across the ribs and the plurality of web areas, the encapsulated odor control component comprising an odor-control active encapsulated within a plurality of encapsulants. In particular, the plurality of encapsulants are configured to delay a release of the odor-control active until activated. Further, the ribs and the plurality of web areas are configured to cause the plurality of encapsulants to activate in phases. The method also involves forming the thermoplastic film into a bag.

Additional features and advantages of exemplary implementations of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings in which.

DETAILED DESCRIPTION

Figure 1C:
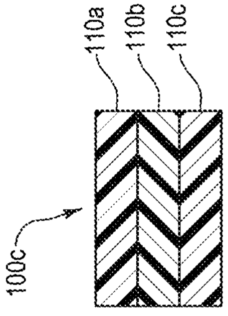
FIGS. 1A-1C illustrate partial side cross-sectional views of thermoplastic films having a variety of layers.

One or more embodiments of the present disclosure include an encapsulated odor control component that operates to release an odor-control active in response to an activation trigger. For example, in one or more embodiments, a thermoplastic film or bag includes an encapsulated odor control component having an odor-control active within a plurality of encapsulants. The encapsulated odor control component is configured to delay a release of the odor-control active from the encapsulant so that little, to no, odor-control active is released until the encapsulated odor control component is activated. To illustrate, in some embodiments, the encapsulated odor control component releases the odor-control active from the encapsulant in response to a physical interaction with the thermoplastic film or bag (e.g., the thermoplastic film or bag is stretched). In some instances, the thermoplastic film or bag is configured to cause the encapsulated odor control component to release the odor-control active in various phases.

In one or more embodiments, the thermoplastic film or bag includes a plurality of ribs and a plurality of web areas. To illustrate, in some embodiments, the plurality of web areas separates and connects ribs of the plurality of ribs. Further, the plurality of web areas is out of plane with the ribs so as to create recesses between adjacent ribs. To illustrate, in some embodiments, the ribs extend outward from the plurality of web areas so that the ribs form raised areas of thermoplastic film and the recesses created by the plurality of web areas form relatively lower areas of thermoplastic film. In some embodiments, the plurality of ribs and the plurality of web areas are formed using one or more of a ring rolling process or SELF'ing process.

In one or more embodiments, the encapsulated odor control component is coextruded with the thermoplastic film or bag so that the encapsulated odor control component is embedded into the thermoplastic film or bag itself. In some embodiments, the encapsulated odor control component is applied to the thermoplastic film or bag after extrusion (e.g., using a liquid or powder application). For example, the encapsulated odor control component can be disposed onto a surface of the thermoplastic film or bag (e.g., in a pattern—such as a strip, a series of dots, or other predetermined pattern—or as a complete layer covering the surface either partially or fully), within a hem of the thermoplastic film or bag, or between a first layer and a second layer of the thermoplastic film or bag.

The odor-control active within the plurality of encapsulants can include one or more volatile fragrances and/or odor control agents. For example, the odor-control active can include one or more perfume raw materials, desiccant materials, antimicrobial agents, deodorizing agents, neutralizing agents, trapping/adsorbing agents, oxidizing agents, absorbing agents, or functional nanoparticles. As a result, in one or more embodiments, the encapsulated odor control component reduces an amount of malodor molecules that permeate through the thermoplastic film or escape through an opening of the thermoplastic film or bag (e.g., the top of a trash bag uncovered during consumer use), masks malodor molecules, and/or otherwise neutralizes malodor.

Some embodiments include an odor-control active that at least partially absorbs and/or traps malodor molecules. In other words, the odor control component can "catch" the malodor molecules. By absorbing and/or trapping the malodor molecules, the odor control component can help reduce or prevent the malodor molecules from spreading or leaving a product.

Further, as mentioned above, in one or more embodiments, the encapsulated odor control component is configured to delay a release of the odor-control active. In particular, in some embodiments, the plurality of encapsulants are configured to delay release of the odor-control active until activated. For example, in some implementations, the plurality of encapsulants are configured to retain the odor-control active until activated by a physical interaction applied to the thermoplastic film (e.g., applied to the plurality of ribs and the plurality of web areas). In response to the physical interaction, the plurality of encapsulants can release the odor-control active, thus providing odor control. In some instances, the plurality of encapsulants are configured to retain the odor-control active until activated by contact with moisture (e.g., water vapor particles) or particles having a particular pH level or a pH level within a range of pH levels. In yet further embodiments, the plurality of encapsulants are configured to release the odor-control active via diffusion. For example, the plurality of encapsulants can gradually release the odor-control active over time as will be discussed in more detail below.

Thus, the thermoplastic film or bag provides improved odor control. For instance, by utilizing the encapsulated odor control component, the thermoplastic film or bag is able to retain the odor-control active until there is a consumer interaction with the thermoplastic film or bag (e.g., placing a trash bag in a trash bin or throwing an article of trash into the trash bag). Accordingly, the thermoplastic film or bag reduces the amount of odor-control active that is depleted after manufacture and before purchase. Further, the thermoplastic film or bag extends the availability of the encapsulated odor control component for instances where odor control is needed.

In one or more embodiments, the thermoplastic film or bag is configured to cause the plurality of encapsulants to activate in different phases. For example, in some implementations, the plurality of encapsulants include a first set of encapsulants disposed on a surface of the ribs and a second set of encapsulants disposed on a surface of the plurality of web areas so that at least some encapsulants from the second set of encapsulants are located within the recesses between adjacent ribs. Thus, the first set of encapsulants are on a different plane than the second set of encapsulants. Accordingly, the position of the first set of encapsulants relative to the second set of encapsulants can be configured to cause the first set of encapsulants to activate in a first phase and the second set of encapsulants to activate in a second phase. For example, the first set of encapsulants can activate in response to a physical strain applied to the thermoplastic film or bag (e.g., applied to the ribs and the web areas) and the second set of encapsulants can subsequently activate in response to an additional physical strain applied to the thermoplastic film or bag. Thus, the thermoplastic film or bag can provide further extended odor control through various stages of use by reducing the amount of odor-control active depleted before a user has finished using the bag. Accordingly, the thermoplastic bag or film enables a user to avoid compensating behavior, such as replacing a trash bag before it is full.

In addition to odor control encapsulants activating in phases due to relative positioning on ribs or webs, one or more embodiments include locating odor control encapsulants in different areas of a bag so as to cause the odor control encapsulants in different areas of the bag to activate at different times and phases. For example, odor control encapsulants positioned proximate the drawstring can activate as the top of the bag is stretched around a trash can or other receptacle. In contrast, odor control encapsulants positioned near the middle or bottom of the bag can activate as trash is placed in the bag. Thus, the odor control encapsulants can be activated at different times or in response different triggers (placing bag around trash receptable, placing trash in the bag, emptying the bag) and within different phases (odor control encapsulants on the ribs can activate before odor control encapsulants within the recessed webs).

As illustrated by the foregoing discussion, the present disclosure utilizes a variety of terms to describe features and benefits of one or more embodiments. Additional detail is now provided regarding the meaning of these terms. As used herein, the term "physical interaction" refers to a physical force applied to a thermoplastic film or bag. In particular, a physical interaction can refer to a physical manipulation of a thermoplastic film or bag (or a portion thereof) or a physical contact between a physical object and the thermoplastic film or bag. For example, a physical interaction can include, but is not limited to, a physical strain applied to a thermoplastic film or bag (or a portion thereof), a friction applied to a thermoplastic film or bag, or a touch of a thermoplastic film or bag (e.g., by a user or an article of trash). More specifically, as used herein, the term "physical interaction" comprises physical forces of a magnitude consistent with use of a trash bag. Example physical interactions can be the results of securing a trash bag within a receptacle, loading the trash bag with trash, removing the trash bag from the receptacle, etc.

Additionally, as used herein, the terms "encapsulated odor control component" and "odor control component" refer to a structure or compound that includes one or more encapsulants and an odor-control active encapsulated within the one or more encapsulants.

As used herein, the term "encapsulant" (or "odor-control encapsulant") refers to a composition capable of, at least partially, encapsulating another composition (e.g., an odor-control active). In particular, an encapsulant can bond to, or enclose, an odor-control active. For example, the encapsulant can include a shell or matrix composition that surrounds the odor-control active. In one or more embodiments, the encapsulant is configured to release the odor-control active in response to a trigger. For example, the encapsulant can be configured to release the odor-control active in response to a physical interaction applied to a thermoplastic film or bag upon which the encapsulant is disposed, such as a physical strain or a friction applied to the thermoplastic film or bag. To illustrate, the encapsulant can include, but is not limited to, a composition made of melamine-formaldehyde, polyuria, polyacrylates, starch, polysaccharides, betacyclodextrins/cyclodextrins, or other polymers, waxes, etc. As a non-limiting example, the encapsulant can include a formaldehyde-based shell that is pliable in liquid form (e.g., used to apply the encapsulant to the thermoplastic film or bag) and becomes brittle as it dries. Thus, physical interactions applied to the thermoplastic film can cause the plurality of encapsulants to break open when dried.

In some embodiments, the encapsulant is configured to release the odor-control active in response to the presence of malodor particles. For example, the odor-control encapsulant can be configured to release the odor-control active in response to the presence of particles/materials having sulfide chemistries, nitrogen chemistries, fatty acids, aldehydes, ketones, ester, or other malodor particles. As non-limiting examples, the odor-control encapsulant can comprise a crystalline lattice composed of basic material that breaks down in the presence of a volatile fatty acid (or other low pH malodors) due to acid-base reactions, releasing the odor-control active. As another non-limiting example, the odor-control encapsulant can include a flexible matrix (e.g., a matrix created with polymer chains) that encapsulates both the odor-control active and another material, such as a transition metal particle. The other material can react with a malodor (e.g., thiol or mercaptan), when present, relaxing the walls of the matrix and allowing the odor-control active to be released.

Additionally, the odor-control encapsulant can be configured to release the odor-control active in response to vapor phase contact with malodor particles (i.e., the odor-control encapsulant need not touch the malodor source). In alternative embodiments, the odor-control encapsulant can be configured to release the odor-control active in response to direct physical contact with the malodor source.

As used herein, the term "phase" refers to an instance in which one or more encapsulants activate (e.g., release an odor-control active) simultaneously or nearly simultaneously. In particular, a phase refers to a separately distinguishable instance or window of time in which a set of encapsulants release the encapsulated odor-control active. Indeed, in one or more embodiments, the plurality of encapsulants of an encapsulated odor control component release the odor-control active in phases.

As used herein, the term "odor-control active" refers to a composition that effects (e.g., changes and/or masks) odors in at least one manner. For example, the odor-control active can absorb (e.g., foul smell odors), adsorb, and/or may include fragrance materials. Furthermore, the odor-control active can mask (e.g., cover up) and/or neutralize malodors. As used herein the term "neutralize" or any of its derivative terms refers to an ability of a compound or product to reduce or eliminate malodorous compounds. Odor neutralization may be partial, affecting only some of the malodorous compounds in a given context, or affecting only a portion of a malodorous compound. A malodorous compound may be neutralized by chemical reaction resulting in a new chemical entity, by sequestration, by chelation, by association, or by any other interaction rendering the malodorous compound less malodourous or non-malodorous.

For example, the odor-control active can include one or more gaseous, liquid, colloidal suspension, and/or solid substances. In one or more embodiments, the odor-control active includes a volatile fragrance material (i.e., a fragrance material capable of being transported to the olfactory system). For example, the odor-control active can include top, middle, and/or bottom notes of a fragrance composed of aromatic materials and other functional groups (e.g., ketones, aldehydes, alcohols, etc.). As used herein the term "fragrance" refers to any mixture or composition comprising one or more perfume raw materials with or without one or more carrier solvents configured to emit a pleasant odor.

In one or more embodiments, the odor-control active comprises functional perfume raw materials (e.g., neutralizing chemistries—such as reactive aldehydes—or perceptual modifiers—such as receptor blockers). As used herein the term "perfume" refers to a compound utilized for its appealing odor. Compounds may have a pleasing odor without being used as a perfume in the context of this disclosure.

In further embodiments, the odor-control active comprises one or more neutralizing agents. For example, in some embodiments, the odor-control active includes oxidizing chemistries (e.g., peroxides, hypochlorous acid, chlorine, ozone, sodium perborate, etc.).

In further embodiments, the odor-control active comprises one or more pro-fragrance systems consisting of two perfume molecules that are molecularly bonded together. One molecule is more substantive to substrates while the other is more volatile. Upon exposure to a specific trigger (e.g., light, heat or oxygen) during normal product use the molecular bond between the two molecules breaks and the more volatile molecule gradually releases over time.

In some embodiments, the odor-control active comprises antimicrobial agents. For example, the odor-control active can include zinc pyrithione ("ZPT") and/or copper pyrithione ("CPT") or any number of other metal substrates. In some embodiments, the odor-control active comprises vapor phase antimicrobials. For example, the odor-control active can comprise essential oils (e.g., thymol, lemongrass, tea tree, etc.), chlorine dioxide and/or ethylene oxide.

Moreover, the odor-control active can include one or more of desiccant materials (e.g., a hygroscopic substance, such as calcium oxide or silica gel, that has a high affinity for water and is used as a drying agent), deodorizing agents (i.e., deodorizing compositions with a deodorizing effect on offensive odors such as that associated with activated nitrogen compound, activated sulfur compounds, etc.), and functional nanoparticles. In yet further embodiments, the odor-control active can include a trapping or an adsorbent/absorbent agent (e.g., zeolites, activated carbon, etc.).

As used herein, the term "odor" refers to any substance that can stimulate an olfactory response in a human; i.e., sense of smell. As used herein, the term "malodor" and any of its derivative terms refers to an odor that is generally considered unpleasant, obnoxious, or nauseating by the general population, such as the broad spectrum of odors associated with household trash, including odors related to stale urine, feces, vomitus, and putrefying organic materials, e.g., food waste, in common household trash. As used herein, the term "malodor particle" refers to a particle or molecule that carries a malodor. Though it will be understood that a malodor particle includes any particle or molecule that carries a malodor, examples of malodor particles include those derived from sulfide chemistries (e.g., dipropyl trisulfide, propyl mercaptan, dimethyl sulfide, dimethyl trisulfide, methal mercaptan, hydrogen sulfide, etc.), nitrogen chemistries (e.g., trimethylamine, trimethylamine, etc.), or aldehydes, keytones, and/or ester (e.g., demascenone, nonenal, pentanal, methinoal, pentyl acetate, etc.).

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction or both. Both partially discontinuous and discontinuous are types of non-continuous bonding (i.e., bonding that is not complete and continuous between two surfaces).

In addition to non-continuous bonding, one or more implementations include incrementally stretching a thermoplastic film. For example, one or more implementations includes incrementally stretching a thermoplastic film using MD ring rolling, TD ring rolling, DD ring rolling, the formation of strainable networks, or combinations thereof. Incrementally stretching a thermoplastic film using the methods described herein can impart ribs or other structures to the film and increase or otherwise modify one or more of the tensile strength, tear resistance, impact resistance, or elasticity of the film. Furthermore, one or more embodiments involve stretching processes with ambient or cold (non-heated) conditions. This differs significantly from most conventional processes that stretch films under heated conditions. Stretching under ambient or cold conditions in accordance with one or more implementations can constrain the molecules in the thermoplastic film so they are not as easily oriented as under heated conditions. Such cold incremental stretching can help provide the unexpected result of maintaining or increasing the strength of a thermoplastic film, despite a reduction in gauge.

Relatively weak bonding and stretching can be accomplished simultaneously through one or more suitable techniques. For example, bonding and stretching may be achieved by pressure (for example MD ring rolling, TD ring rolling, helical or DD ring rolling, strainable network lamination, or embossing), or with a combination of heat and pressure. Alternately, a manufacturer can first stretch the films and then bond the films using one or more bonding techniques. For example, one or more implementations can include ultrasonic bonding to lightly laminate the films. Alternately or additionally, adhesives can laminate the films. Treatment with a Corona discharge can enhance any of the above methods. In one or more embodiments, the contacting surfaces/layers can comprise a tacky material to facilitate lamination. Prior to lamination, the separate films can be subject to separate processes, such as stretching, slitting, coating and printing, and corona treatment or can be not subject to any separate process.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

As used herein, any relational terms such as "first," "second," and "third," "inner," "outer," "upper," "lower," "side," "top," "bottom," etc. are for clarity and convenience in understanding the present disclosure and accompanying drawings and does not connote or depend on any specific preference, orientation, or order, except where the context clearly indicates otherwise. For example, the relational terms may refer an orientation of a multi-layer bag while disposed within a receptacle (e.g., a trash can) for use.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly (ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some embodiments of the present disclosure may include any flexible or pliable thermoplastic material that may be formed or drawn into a web or film. Furthermore, each thermoplastic film may include a single layer or multiple layers of thermoplastic materials as described in further detail below in regard to FIGS. 1A-1C. The thermoplastic material may be opaque, transparent, translucent, or tinted. Furthermore, the thermoplastic material may be gas permeable or impermeable.

Additional additives that may be included in one or more embodiments include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

Further additives that may be included in one or more embodiments include natural oils. For example, the additives may include thyme oil, mint oil, lemon grass oil, tea tree oil, cinnamon bark oil, methyl jasmonate, etc. Yet further additives may include zinc pyrithione ("ZPT") and copper pyrithione ("CPT"), which inhibit microbial growth.

One of ordinary skill in the art will appreciate in view of the present disclosure that manufacturers may form the films or webs to be used with the present disclosure using a wide variety of techniques. For example, a manufacturer can form a precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction (i.e., across the stretch), often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more embodiments, a manufacturer can use multiple extruders to supply different melt streams, which a feed block can order into different channels of a multichannel die. The multiple extruders can allow a manufacturer to form a multi-layer film with layers having different compositions. Such multi-layer film may later be noncontinuously laminated with another layer of film.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.3 mils and about 0.5 mils. Additionally, the starting gauge of films of one or more implementations of the present disclosure may not be uniform. Thus, the starting gauge of films of one or more implementations of the present disclosure may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

The following discussion provides more detail with regard to one or more embodiments with reference to the figures. One or more embodiments of the present disclosure include products made from or with thermoplastic films and that include an encapsulated odor control component. For example, such products include, but are not limited to, grocery bags, trash bags, sacks, and packaging materials, feminine hygiene products, baby diapers, adult incontinence products, or other products. For ease in description, however, the figures and bulk of the following disclosure focuses on films and bags. One will further appreciate that the teachings and disclosure equally applies to other products as well. For example, some embodiments of the present disclosure include nonwovens in place of the films described herein. Additional embodiments of the present disclosure include other materials in place of the films described herein.

Figure 1B:
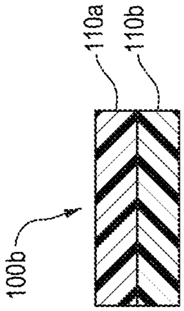
Figure 1A:
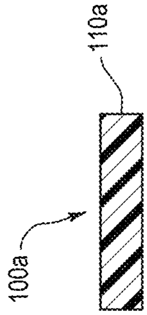

FIG. 1A illustrates a film ply 100*a* of a single layer 101. In another implementation, as illustrated by FIG. 1B, a film ply 100*b* can have multiple sub-layers (i.e., a bi-layered film). In particular, the film ply 100*b* can include a first sub layer 110*a* and a second sub layer 110*b*. The first and second sub layers 110*a*, 110*b* can optionally include different grades of thermoplastic material or include different additives, including polymer additives. In still another implementation, shown in FIG. 1C, a film ply 100*c* can include three sub layers (i.e., a tri-layered film). For example, FIG. 1C illustrates that the film 100*c* can include a first sub layer 110*a*, a second sub layer 110*b*, and a third sub layer 110*c*.

As described above, the films 100*a*-100*c* referred to herein may include one layer or a plurality of thermoplastic sub layers. In addition to thermoplastic materials, the films 100*a*-100*c* can include additives, as desired (e.g., pigments, slip agents, anti-block agents, tackifiers, or combinations thereof). In at least one implementation, such as shown in FIG. 1C, a multilayered film 100*c* can include co-extruded layers. For example, the film 100*c* can include a three-layer B:A:B structure, where the ratio of sub layers can be 20:60:20. The exterior B sub layers (i.e., 110*a*, 110*c*) can comprise a mixture of hexene LLDPE of density 0.918, and metallocene LLDPE of density 0.918. The interior A core layer (110*b*) can comprise a mixture of hexene LLDPE of density 0.918, butene LLDPE of density 0.918, reclaimed resin from trash bags. Additionally, the A core sub layer 110*b* can optionally include a colorant, resulting in a colored film.

In another implementation, the film 100*c* is a coextruded three-layer B:A:B structure, where the ratio of sub layers is 20:60:20. The exterior B sub layers (110*a*, 110*c*) can comprise hexene LLDPE of density 0.918, and metallocene LLDPE of density 0.918. The interior A core sub layer (110*b*) can comprise hexene LLDPE of density 0.918, metallocene LLDPE of density 0.918, butene LLDPE of density 0.918, reclaimed resin from trash bags. The A core sub layer 110*c* can also include a processing aide and one or more colorants.

In another example, the film 100*c* is a coextruded three-layer B:A:B structure where the ratio of sub layers is 15:70:15. The A core sub layer 110*b* can comprise a LLDPE material, and the B outer sub layers 110*a*, 110*c* can include added C6 olefin LLDPE. The LLDPE material can have a MI of 1.0 and density of 0.920 g/cm3. The B:A:B structure can also optionally have a ratio of B:A that is greater than 20:60 or less than 15:70. In one or more implementations, the LLDPE can comprise greater than 50% of the overall thermoplastic material in the film 100*c*.

In another example, the film 100*c* is a coextruded three-layer C:A:B structure where the ratio of sub layers is 20:60:20. The C sub layer 110*a* can comprise a LLDPE material with a first colorant. The B sub layer 110*c* can also comprise a LLDPE material with a second colorant. The LLDPE material can have a MI of 1.0 and density of 0.920 g/cm3. The A core sub layer 110*b* can comprise similar materials to any of the core sub layer describe above.

In accordance with one implementation, a structural elastic-like film (SELF) process may be used to create a thermoplastic film with strainable networks. In some implementations (e.g., where the thermoplastic film includes multiple layers), the SELF process results in discontinuous bonding of adjacent layers. Indeed, the strainable networks can include adjacent bonded and un-bonded regions. U.S. Pat. Nos. 5,518,801; 6,139,185; 6,150,647; 6,394,651; 6,394,652; 6,513,975; 6,695,476; U.S. Patent Application Publication No. 2004/0134923; and U.S. Patent Application Publication No. 2006/0093766 each disclose processes for forming strainable networks or patterns of strainable networks suitable for use with implementations of the present disclosure. The contents of each of the aforementioned patents and publications are incorporated in their entirety by reference herein. As used herein, the term "strainable network" refers to an interconnected and interrelated group of regions which are able to be extended to some useful degree in a predetermined direction providing the web material with an elastic-like behavior in response to an applied and subsequently released elongation.

Figure 2:
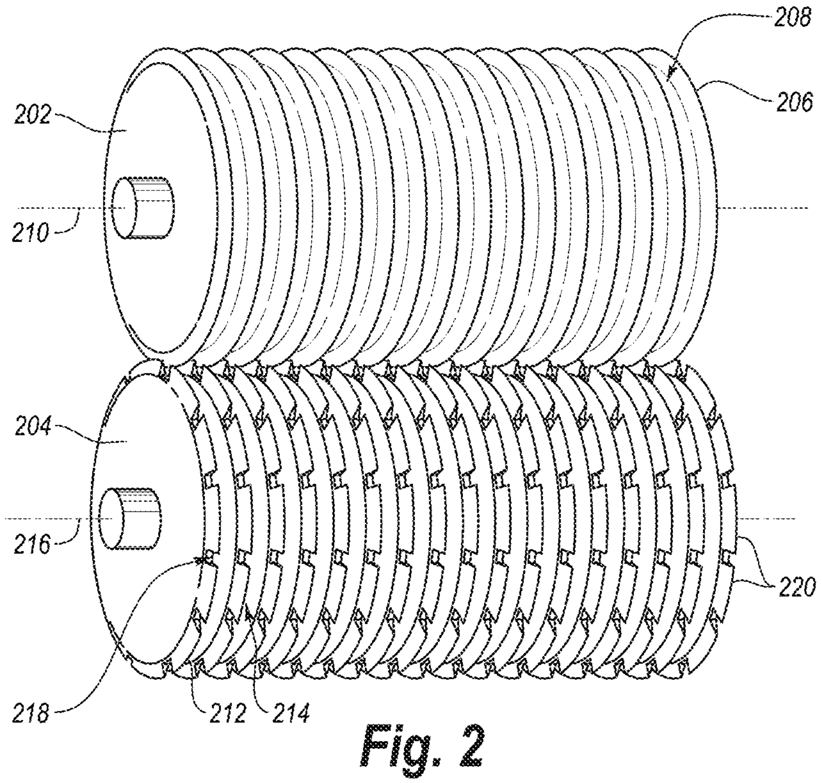
FIG. 2 illustrates a schematic diagram of a set of intermeshing rollers used to form a structural elastic like film (SELF) by imparting strainable networks into the film while lightly laminating adjacent layers of a film in accordance with one or more embodiments.

FIG. 2 illustrates a pair of SELF'ing intermeshing rollers 202, 204 for creating strainable networks in a thermoplastic film. The first SELF'ing intermeshing roller 202 can include a plurality of ridges 206 and grooves 208 extending generally radially outward in a direction orthogonal to an axis of rotation 210. The second SELF'ing intermeshing roller 204 can also include a plurality of ridges 212 and grooves 214 extending generally radially outward in a direction orthogonal to an axis of rotation 216. As shown by FIG. 2, however, the ridges 212 of the second SELF'ing intermeshing roller 204 can include a plurality of notches 218 that define a plurality of spaced teeth 220.

Figure 3A:
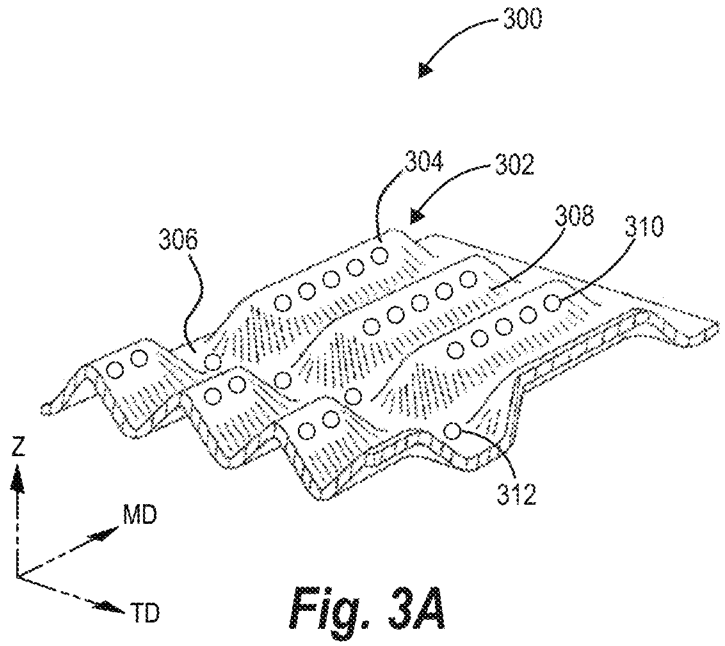
FIG. 3A illustrates a side view of a thermoplastic film created by passing a thermoplastic film through the intermeshing rollers of FIG. 2 with an applied encapsulated odor control component thereon in accordance with one or more embodiments.

Referring now to FIG. 3A, a thermoplastic film 300 created using the SELF'ing intermeshing rollers 202, 204, is shown. In particular, as the thermoplastic film 300 passes through the SELF'ing intermeshing rollers 202, 204, the teeth 220 can press a portion of the thermoplastic film 300 out of plane to cause permanent deformation of a portion of the thermoplastic film 300 in the Z-direction. The portions of the thermoplastic film 300 that passes between the notched regions (i.e., the notches 218) of the teeth 220 will be substantially unformed in the Z-direction, resulting in a plurality of deformed, raised, rib-like elements 302. The length and width of the rib-like elements 302 depends on the length and width of teeth 220.

As shown by FIG. 3A, the strainable network of the thermoplastic film 300 can include first thicker regions 304, second thicker regions 306, and stretched, thinner transitional regions 308 connecting the first and second thicker regions 304, 306. The first thicker regions 304 and the stretched, thinner transitional regions 308 can form the raised, rib-like elements 302 of the strainable network. Further, the second thicker regions 306 can form web areas of the thermoplastic film 300. In particular, the second thicker regions 306 can form web areas that are out of plane with the raised, rib-like elements 302 so as to create recesses between adjacent rib-like elements.

As shown in FIG. 3A, the thermoplastic film 300 further includes an encapsulated odor control component. In particular, the encapsulated odor control component includes an odor-control active (not shown) encapsulated within a plurality of encapsulants 310. As shown, the encapsulants 310 can be applied across the raised, rib-like elements 302 and the web areas corresponding to the second thicker regions 306. For example, as shown in FIG. 3A, a first set of the encapsulants 310 can be disposed on a surface of the raised, rib-like elements 302 (e.g., on the first thicker regions 304), and a second set of the encapsulants 310 can be disposed on a surface of the web areas (e.g., on the second thicker regions 306) so that at least some encapsulants from the second set of the encapsulants 310 (e.g., the encapsulant 312) are positioned within the recesses between adjacent ribs. Though FIG. 3B only shows the first set of the encapsulants 310 on the first thicker regions 304 corresponding to the raised, rib-like elements 302, encapsulants can additionally or alternatively be disposed on the stretched, thinner regions 308 in some implementations. In other words, the surface of the raised, rib-like elements 302 can include the first thicker regions 304 as well as the stretched, thinner regions 308.

In one or more embodiments, the encapsulated odor control component is applied to the thermoplastic film 300 after the thermoplastic film 300 is passed through the SELF'ing intermeshing rollers 202, 204. In some embodiments, however, the encapsulated odor control component is applied before the thermoplastic film 300 is passed through the SELF'ing intermeshing rollers 202, 204. In such a case, the pliability of the encapsulants 310 (e.g., before the encapsulants 310 have dried) may allow the encapsulants 310 to pass through the SELF'ing intermeshing rollers 202, 204 unbroken.

In some implementations, the encapsulants 310 are configured to delay a release of the odor-control active until activated (e.g., triggered). In other words, the encapsulants 310 can retain the encapsulated odor-control active until activated to release the odor-control active. For example, in one or more embodiments, the encapsulants 310 retain the odor-control active until activated to release the odor-control active in response to a physical interaction applied to the thermoplastic film 300 (e.g., applied to the raised, rib-like elements 302 corresponding to the first thicker regions 304 and the web areas corresponding to the second thicker regions 306). To illustrate, the encapsulants 310 can be configured to activate to release the odor-control active in response to a physical strain applied to the thermoplastic film 300.

The rib-like elements 302 can allow the thermoplastic film 300 to undergo a substantial "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of thermoplastic films which are generally discernible to the normal naked eye when the thermoplastic films or articles embodying the thermoplastic films are subject to an applied strain. Types of geometric deformation include, but are not limited to bending, unfolding, and rotating.

Figure 3B:
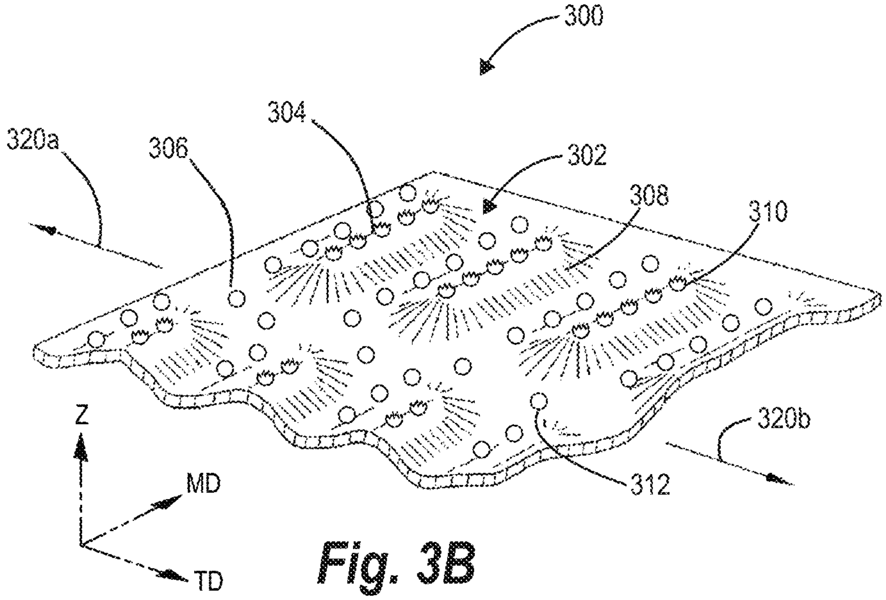
FIG. 3B illustrates a side view of the thermoplastic film of FIG. 3A having a strain applied thereto in accordance with one or more embodiments.

Thus, as shown in FIG. 3B upon application of a physical strain (e.g., in the TD direction as indicated by the arrows 320*a*-320*b*), the raised, rib-like elements 302 can undergo geometric deformation before either the raised, rib-like elements 302 or the flat regions corresponding to the web areas undergo molecular-level deformation. For example, an applied physical strain can pull the raised, rib-like elements 302 back into plane with the flat regions corresponding to the web areas prior to any molecular-level deformation of the thermoplastic film 300. Geometric deformation can result in significantly less resistive forces to an applied strain than that exhibited by molecular-level deformation.

As further shown in FIG. 3B, a portion of the encapsulants 310 can activate to release the odor control active in response to the applied physical strain. In particular, as shown in FIG. 3B, the first set of the encapsulants 310 on the surface of the raised, rib-like elements 302 (e.g., on the first thicker regions 304) have been activated while the second set of the encapsulants 310 on the surface of the web areas (e.g., on the second thicker regions 306) have not been activated in response to the applied physical strain.

Indeed, in one or more embodiments, the raised, rib-like elements 302 and the web areas are configured to cause the encapsulants 310 to activate in phases. For example, the position of the first set of the encapsulants 310 relative to the second set of the encapsulants 310 (e.g., the set of encapsulants disposed on the second thicker regions 306, including the encapsulant 312) can cause the first set of the encapsulants 310 to activate in a first phase in response to a physical strain applied to the thermoplastic film 300. Further, the relative positioning can cause the second set of the encapsulants 310 to activate in a subsequent phase in response to an additional physical strain applied to the thermoplastic film 300.

To illustrate, in one or more embodiments, as the physical strain is applied to the thermoplastic film 300 and the raised, rib-like elements 302 are pulled back into plane with the flat regions corresponding to the web areas, the surface of the raised, rib-like elements 302 flattens, stretches, or otherwise moves, causing the first set of the encapsulants 310 to activate and release the odor-control active. For example, the physical strain can stretch the surface of the raised, rib-like elements 302 sufficiently to overcome the structural integrity (e.g., the tensile strength) of the first set of the encapsulants. In other words, in one or more embodiments, a geometric deformation of the raised, rib-like elements 302 in response to a physical strain can be sufficient to cause the first set of the encapsulants 310 to activate to release the odor-control active. To further the illustration, the web areas may be unaffected by the (initial) physical strain applied to the thermoplastic film 300 (as the raised, rib-like elements 302 undergo geometric deformation before the web areas undergo deformation, as discussed above). Thus, the positioning of the second set of the encapsulants 310 on the surface of the web areas is configured to enable the second set of the encapsulants 310 to retain the odor-control active until they are activated by an additional strain applied to the thermoplastic film 300 that causes the web areas to undergo some deformation.

Figure 3C:
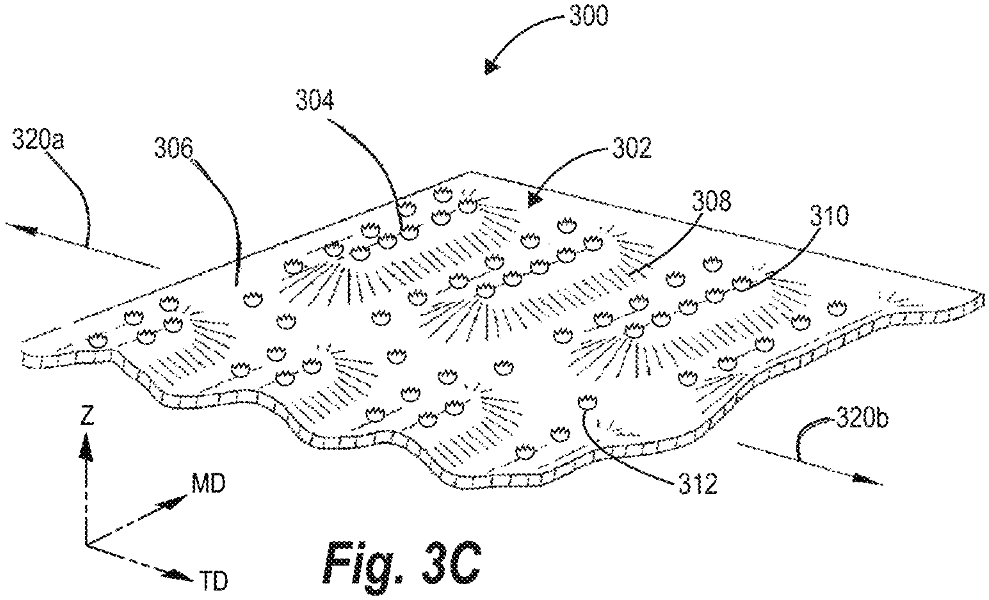
FIG. 3C illustrates a side view of the thermoplastic film of FIG. 3B having an additional strain applied thereto in accordance with one or more embodiments.

Indeed, FIG. 3C illustrates application of an additional physical strain (e.g., in the TD direction as indicated by the arrows 320*a*-320*b*) to the thermoplastic film 300. As shown in FIG. 3C, as the additional physical strain is applied to the thermoplastic film 300, the second set of the encapsulants 310 (e.g., the set of encapsulants disposed on the second thicker regions 306, including the encapsulant 312) can activate to release the odor-control active. For example, as the additional physical strain is applied, the web areas can undergo some deformation, resulting in activation of the second set of the encapsulants 310.

In one or more embodiments, the encapsulants 310 are configured to activate in response to various additional or alternative physical interactions. For example, the encapsulants 310 can be configured to activate in response to an applied friction or a pressure.

Further, though much of the present disclosure discusses the encapsulants 310 being activated by a physical interaction with the thermoplastic film 300, the encapsulants 310 can be configured to activate based on various other triggers in other implementations. For example, in some implementations, the encapsulants 310 are configured to activate the release of the odor-control active based on pH exposure. For example, the encapsulants 310 can be configured to activate to release the odor-control active based on exposure to (e.g., contact with) malodor particles from a malodor source having a particular pH level or having a pH level within a range of pH levels. In some embodiments, the encapsulants 310 are configured to activate to release the odor-control active based on exposure to water, water vapor, or some other liquid.

In some embodiments, the encapsulants 310 are configured to release the odor-control active over time. In other words, the encapsulants 310 can be configured for time-based activation so that the encapsulants 310 release the odor-control active over time without any other trigger causing release of the odor-control active. For example, the encapsulants 310 can include a porosity characteristic that causes the encapsulants 310 to release the odor-control active over time. In some embodiments, the encapsulants 310 are highly porous so that large amounts of the odor-control active are released over a short period of time (e.g., the encapsulants 310 release the odor-control active relatively quickly). In other embodiments, the encapsulants 310 are not highly porous so that a small amount of odor-control active is released over a short period of time (e.g., the encapsulants 310 release the odor-control active relatively slowly). In some implementations, the encapsulants 310 are configured for time-based activation and activation in response to another trigger. Thus, for example, the encapsulants 310 can be configured to release odor-control active over time and then, in response to a physical interaction applied to the thermoplastic film 300, release the remainder of the odor-control active. In some embodiments, the encapsulants 310 are impermeable (i.e., non-porous) so that the encapsulants 310 maintain all of the encapsulated odor-control active until otherwise activated.

Figure 3D:
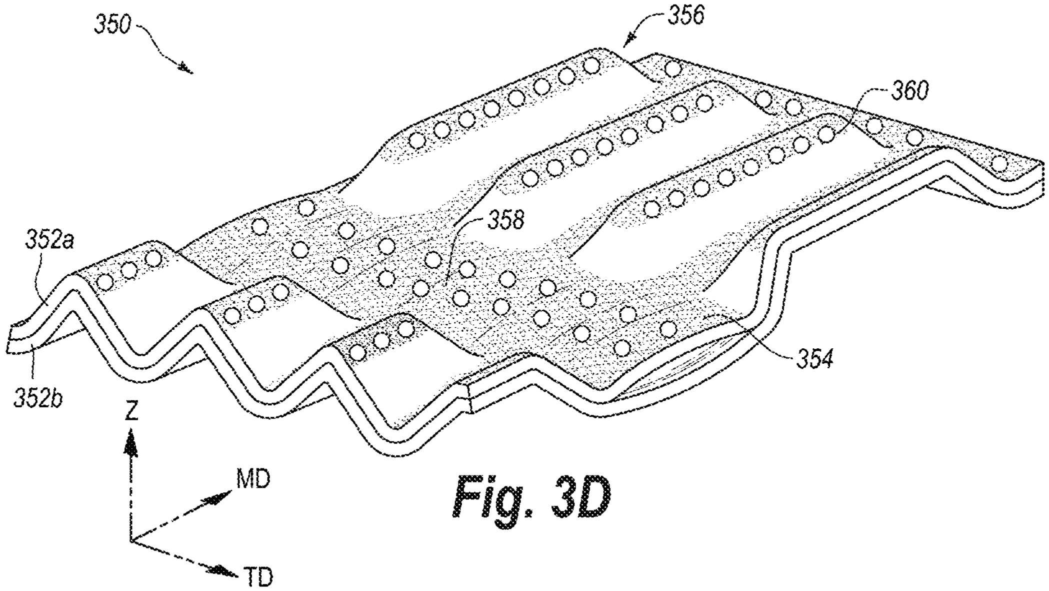
FIG. 3D illustrates a structure of thermoplastic films created by passing multiple layers of thermoplastic film through the intermeshing layers of FIG. 2 and applying an encapsulated odor control component thereon in accordance with one or more embodiments.

Referring now to FIG. 3D, a structure of thermoplastic films 350 created using the SELF'ing intermeshing rollers 202, 204, is shown. Indeed, in one or more embodiments, in addition to the ability to geometrically deform, the SELF'ing intermeshing rollers 202, 204 can further laminate multiple layers of thermoplastic film. For example, in one or more embodiments, the SELF'ing process discontinuously and lightly laminates adjacent layers of thermoplastic films. In particularly, the thermoplastic films 352*a*-352*b* can be lightly laminated at some regions, but un-bonded at other regions, such as the region 354.

As further shown in FIG. 3D, the structure of thermoplastic films 350 can include an encapsulated odor control component. In particular, the structure of thermoplastic films 350 includes a plurality of encapsulants 360 of the encapsulated odor control component applied across the raised, rib-like elements 356 and the web areas 358 of the thermoplastic film 352*a*. As will be discussed in more detail below, in one or more embodiments, the structure of thermoplastic films 350 includes the encapsulated odor control component between the thermoplastic films 352*a*-352*b* (e.g., within un-bonded regions of the structure of thermoplastic films 350).

Although FIGS. 2-3D discuss the SELF'ing process and thermoplastic films and bags created from the SELF'ing process, it should be noted that the thermoplastic films and bags described herein can be created from various alternative processes. For example, the thermoplastic films and bags can be created to include a plurality of ribs and a plurality of web areas using a ring rolling process as described in U.S. patent application Ser. No. 15/967,238, filed Apr. 30, 2018, and entitled "NON-CONTINUOUSLY LAMINATED STRUCTURES OF THERMOPLASTIC FILMS WITH DIFFERING MATERIAL COMPOSITIONS AND FUNCTIONAL MATERIAL PROPERTIES" and issued as U.S. Pat. No. 10,293,981, which is incorporated herein by reference in its entirety.

As mentioned above, in one or more embodiments, the encapsulated odor control component is configured to delay a release of an odor-control active. For example, the plurality of encapsulants of the encapsulated odor control component can be configured to retain the odor-control active until activated to release the odor-control active in response to a physical interaction applied to thermoplastic film upon which the encapsulated odor control component is disposed.

FIGS. 4A-4D illustrate activation of the encapsulated odor control component (i.e., activation of the plurality of encapsulants) in response to a physical interaction in accordance with one or more embodiments. While FIGS. 4A-4D illustrate activation of the encapsulated odor control component in the context of thermoplastic bags, it will be appreciated that activation of the encapsulated odor control component can operate similarly with respect to thermoplastic films in general, including other products made from or with thermoplastic films.

Figure 4A:
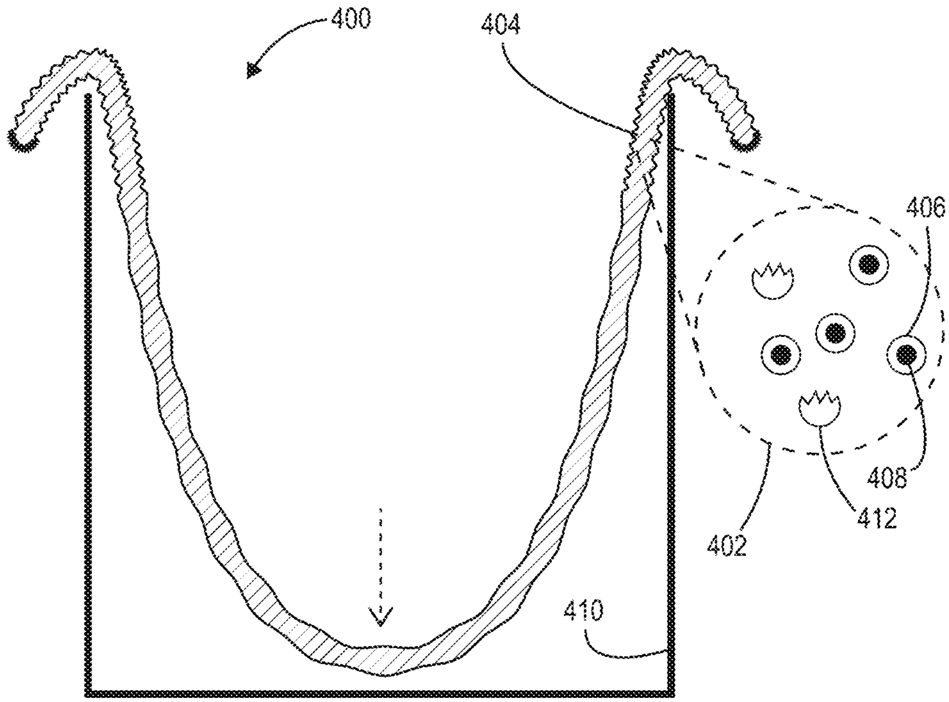
FIGS. 4A-4D illustrate activation of an encapsulated odor control component disposed on a thermoplastic bag in response to a physical interaction in accordance with one or more embodiments.

FIG. 4A illustrates a thermoplastic bag 400 having an encapsulated odor control component. For example, FIG. 4A illustrates a portion of the encapsulated odor control component 402 disposed on a segment 404 of the thermoplastic bag 400 (e.g., the segment being from an inner surface of the thermoplastic bag 400). In particular, the portion of the encapsulated odor control component 402 includes a plurality of encapsulants encapsulating an odor-control active, such as the encapsulant 406 encapsulating the odor-control active 408.

In particular, FIG. 4A illustrates a scenario in which the thermoplastic bag 400 is placed within a trash receptacle 410. As the thermoplastic bag 400 is placed in the trash receptacle 410, the segment 404 of the thermoplastic bag 400 may be strained (e.g., to fit the opening of the thermoplastic bag 400 around the edges of the trash receptacle 410). As shown in FIG. 4A, in response to the strain, one or more of the encapsulants from the portion of the encapsulated odor control component 402 (e.g., the encapsulant 412) can activate to release the odor-control active. As further shown in FIG. 4A, one or more encapsulants from the portion of the encapsulated odor control component 402 (e.g., the encapsulant 406) can remain unactivated, retaining the odor-control active. For example, in some embodiments, the activated encapsulants include those encapsulants disposed on a surface of one or more raised, rib-like elements of the thermoplastic bag 400 while the unactivated encapsulants include those encapsulants disposed on a surface of the web areas so as to be positioned within the recesses between adjacent raised, rib-like elements.

Figure 4B:
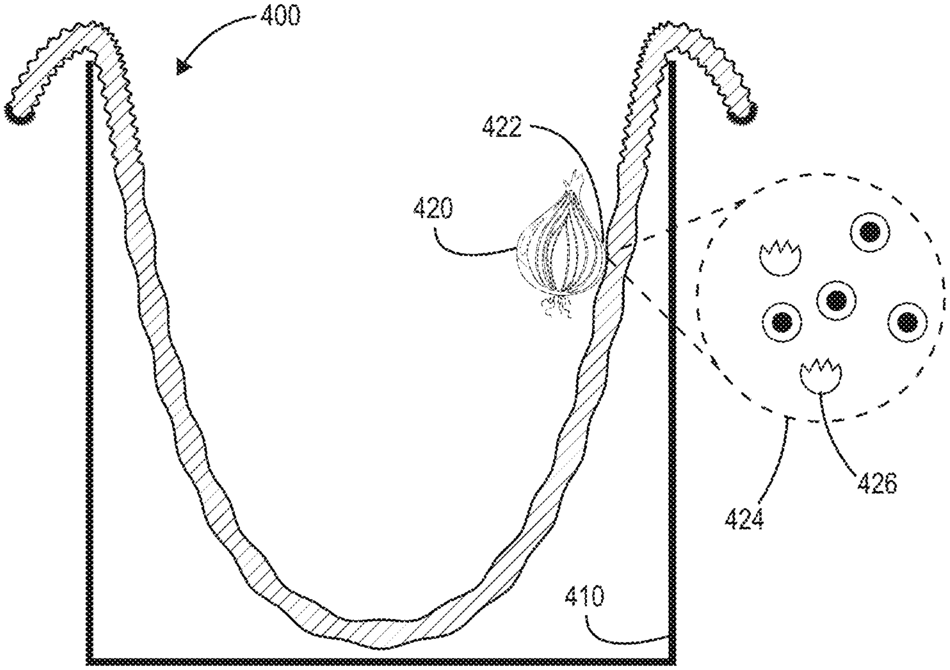

FIG. 4B illustrates the thermoplastic bag 400 within the trash receptacle 410. In particular, FIG. 4B illustrates the thermoplastic bag 400 as an object 420 (e.g., an article of trash) is placed inside. As shown in FIG. 4B, the object 420 contacts (e.g., bumps, rubs against, or otherwise touches) the segment 422 of the thermoplastic bag 400 as it is placed inside.

In response to the contact with the segment 422 of the thermoplastic bag 400 by the object 420, encapsulants (e.g., the encapsulant 426) from the portion of the encapsulated odor control component 424 disposed on the segment 422 can activate to release the odor control active. In particular, by contacting the segment 422 of the thermoplastic bag 400, the object 420 can apply a friction or other force to the segment 422, which causes the encapsulants to activate.

Indeed, in one or more embodiments, a friction is sufficient to activate encapsulants to release the odor-control active. For example, as mentioned above, in one or more embodiments, the encapsulants of the encapsulated odor control component are brittle when dried. Accordingly, the encapsulants are configured to activate (e.g., break) to release the odor-control active when a friction is applied (e.g., via an object contact a segment of a thermoplastic bag upon which the encapsulants are disposed).

Figure 4C:
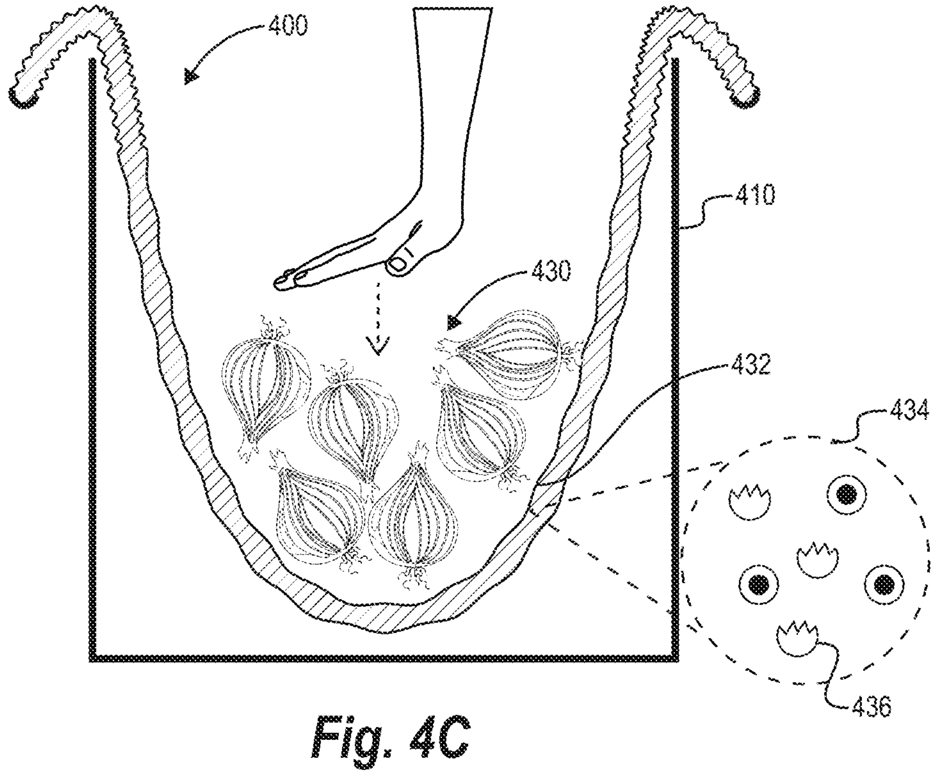

FIG. 4C also illustrates the thermoplastic bag 400 in the trash receptacle 410. In particular, FIG. 4C illustrates the thermoplastic bag 400 as a plurality of objects 430 (e.g., trash) within the thermoplastic bag 400 are pushed downward, such as when a user pushes down to make more room in the thermoplastic bag 400. As the plurality of objects 430 is pushed down, the segment 432 of the thermoplastic bag 400 may be strained. In response to the strain applied to the segment 432 of the thermoplastic bag 400, encapsulants (e.g., the encapsulant 436) from the portion of the encapsulated odor control component 434 disposed on the segment 432 can activate to release the odor control active.

In addition to activating in response to the strain placed on the segment 432 of the thermoplastic bag 400, encapsulants disposed thereon can further activate in response to a friction applied to the segment 432 due to the downward force applied to the plurality of objects 430. In particular, while being pushed downward, the plurality of objects 430 can contact (e.g., rub or slide against) the segment 432 of the thermoplastic bag 400, causing a friction to be applied to the segment 432. Accordingly, encapsulants from the portion of the encapsulated odor control component 434 disposed on the segment 432 can activate to release the odor-control active.

Figure 4D:
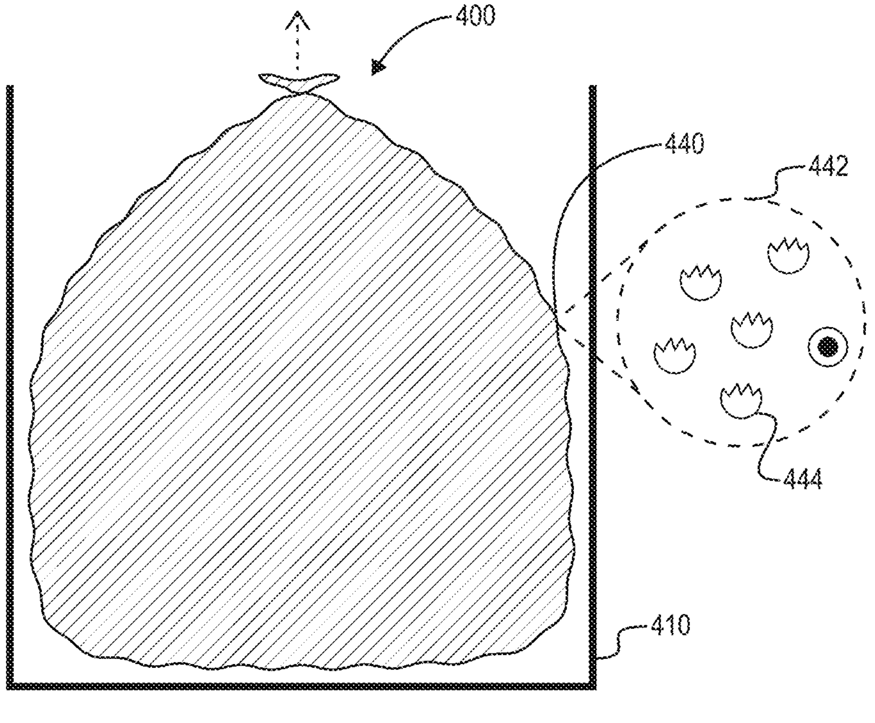

FIG. 4D also illustrates the thermoplastic bag 400 in the trash receptacle 410. In particular, FIG. 4D illustrates the thermoplastic bag 400 being lifted out of the trash receptacle 410 for disposal (e.g., when the thermoplastic bag 400 is full and ready to be replaced). As the thermoplastic bag 400 is lifted out of the trash receptacle 410, the segment 440 of the thermoplastic bag 400 may be strained. In response to the strain applied to the segment 440 of the thermoplastic bag 400, encapsulants (e.g., the encapsulant 444) from the portion of the encapsulated odor control component 442 disposed on the segment 440 can activate to release the odor control active.

In addition to activating in response to the strain placed on the segment 440 of the thermoplastic bag 400, encapsulants disposed thereon can further activate in response to a friction applied to the segment 440 due to being lifted out of the trash receptacle 410. In particular, while the thermoplastic bag 400 is lifted out of the trash receptacle 410, the segment 440 of the thermoplastic bag 400 can rub against the trash receptacle 410 or trash within the thermoplastic bag 400, causing a friction to be applied to the segment 440. Accordingly, encapsulants from the portion of the encapsulated odor control component 442 disposed on the segment 440 can activate to release the odor-control active.

Though FIGS. 4A-4D illustrates specific physical interactions that cause encapsulants disposed on a thermoplastic bag to activate to release an odor-control active, it will be appreciated that the encapsulants can activate in response to various additional physical interactions. For example, in some implementations, the thermoplastic bag 400 is configured so that encapsulants disposed thereon activate in response to opening the bag for use (e.g., placement within the trash receptacle 410) or closing the bag for replacement. To illustrate, in some implementations, a portion of the encapsulated odor control component can be disposed on various creases that result from folding the thermoplastic bag 400 to place in a packaging. Accordingly, in response to a strain or other physical interaction that is applied as the thermoplastic bag 400 is unfolded, at least some of the encapsulants of the portion of the encapsulated odor control component can activate to release the odor-control active.

Further, though FIGS. 4A-4D illustrate only a portion of the encapsulants disposed on a segment of the thermoplastic bag 400 activating in response to a strain or a friction applied to the segment, the encapsulants and/or the positioning of the encapsulants can be configured to cause all encapsulants to activate in some implementations. Further, FIGS. 4A-4D illustrate one instance in which encapsulants disposed on a segment of the thermoplastic bag activate to release the odor-control active. It will be appreciated however, that the thermoplastic bag 400 can be configured so that encapsulants disposed on a given segment activate in multiple instances (e.g., a first set of the encapsulants activate at a first time and a second set of the encapsulants activate at a second time). Indeed, in one or more embodiments, the thermoplastic bag 400 is configured so that encapsulants disposed on a given segment can be activated at various points throughout the use of the thermoplastic bag 400. In some implementations, however (e.g., as illustrated in FIGS. 4A-4D), the thermoplastic bag 400 is configured to cause the encapsulants disposed on various segments to activate at various points throughout the use of the thermoplastic bag 400. Thus, the thermoplastic bag 400 can be configured to cause at least some encapsulants disposed on some segment to activate throughout the use of the thermoplastic bag 400, enabling the thermoplastic bag 400 to provide improved (e.g., longer-lasting) odor control.

Configuring the encapsulants of an encapsulated odor control component to release the odor-control active in response to a physical interaction applied to a thermoplastic film enables disposition of the encapsulated odor control component onto thermoplastic films in a variety of ways. FIGS. 5-7B illustrate example dispositions of the encapsulated odor control component in accordance with one or more embodiments. As with FIGS. 4A-4D, FIGS. 5-7B illustrate the disposition of the encapsulated odor control component onto a thermoplastic bag, though the encapsulated odor control component can be similarly disposed on a thermoplastic film or other products made from, or with, thermoplastic films.

Figure 5:
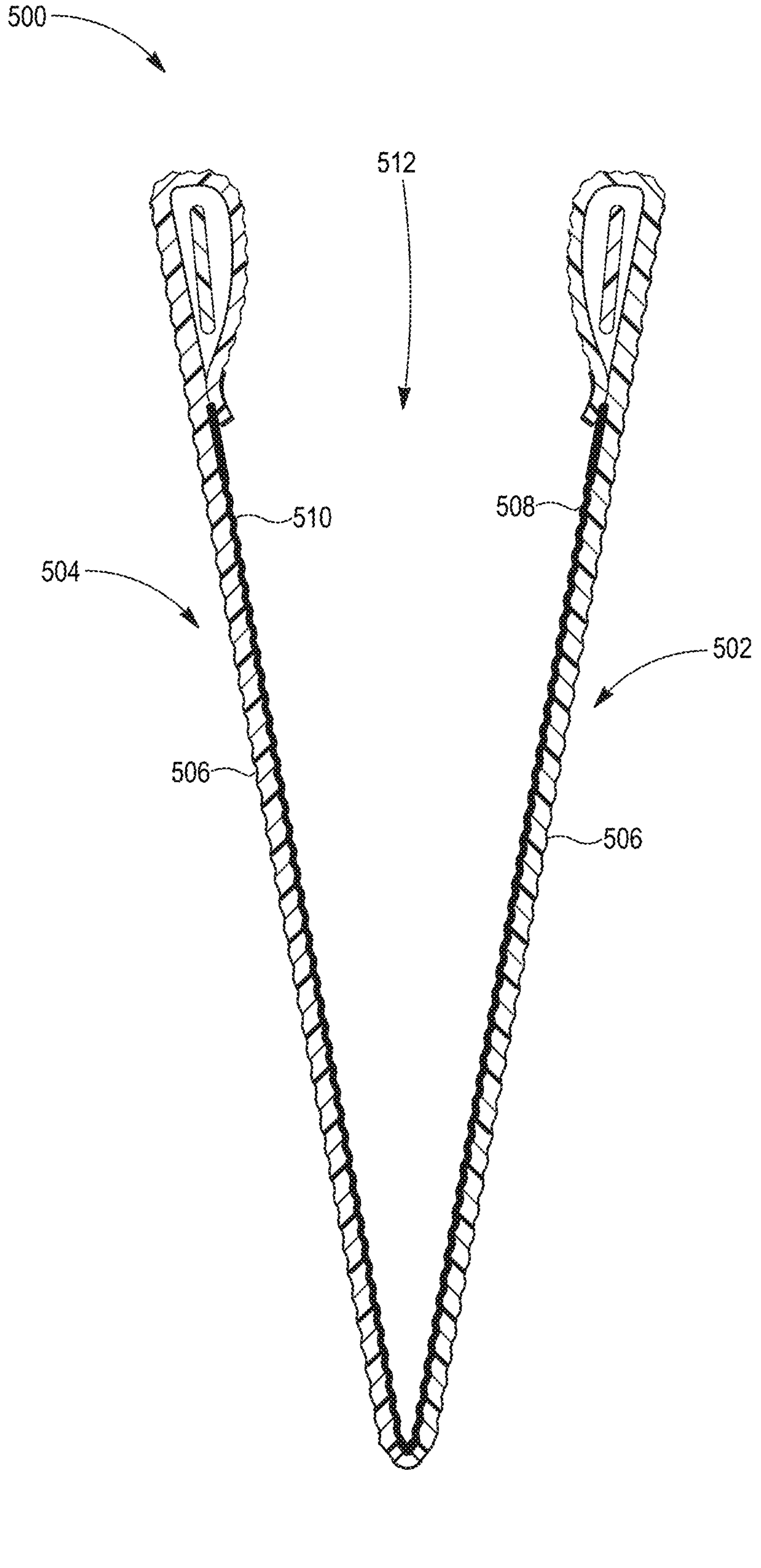
FIG. 5 illustrates a side cross-sectional view of a thermoplastic bag having an encapsulated odor control component in accordance with one or more embodiments.

FIG. 5 illustrates a side cross-sectional view of a thermoplastic bag 500 having an encapsulated odor control component disposed thereon in accordance with one or more embodiments. As shown in FIG. 5, each of the first sidewall 502 and the second sidewall 504 of the thermoplastic bag 500 includes a single layer of thermoplastic film 506. The thermoplastic film 506 of the first sidewall 502 and the second sidewall 504 can include any of the thermoplastic films described above. In one or more embodiments, each of the first and second sidewalls 502, 504 of the thermoplastic bag 500 include multiple layers of thermoplastic film as will be discussed in more detail with reference to FIGS. 7A-7B. As further shown in FIG. 5, the thermoplastic film 506 of the first sidewall 502 and the second sidewall 504 includes a plurality of ribs and a plurality of web areas, such as those created using the SELF'ing intermeshing rollers 202, 204.

Additionally, as shown in FIG. 5, the thermoplastic bag 500 includes the encapsulated odor control component 508 disposed to cover an interior surface of the first sidewall 502 (i.e., the surface of the sidewall facing the opening 512 of the thermoplastic bag 500) and the encapsulated odor control component 510 disposed to cover an interior surface of the second sidewall 504. In one or more embodiments, however, the encapsulated odor control components 508, 510 are disposed on an exterior surface of the respective sidewall. Further, some embodiments involve coextruding the encapsulated odor control component 508 with the first sidewall 502 and the encapsulated odor control component 510 with the second sidewall 504 (i.e., embedding the encapsulated odor control components 508, 510 into the thermoplastic film forming the first sidewall 502 and the second sidewall 504, respectively, during the extrusion process) as discussed above. By disposing the encapsulated odor control components 508, 510 to cover the entire available surface, the thermoplastic bag 500 supplies a more even distribution of the encapsulated odor control component, providing a more prominent odor control. In some implementations, covering the entire available surface allows for a greater amount of the encapsulated odor control component to be applied to the thermoplastic bag 500.

In some implementations, the encapsulated odor control components 508, 510 are disposed to cover less than the entire interior surface (or exterior surface) of the respective sidewall. For example, the encapsulated odor control components 508, 510 can be disposed on the first sidewall 502 and the second sidewall 504, respectively, as strips, a series of dots, one or more streaks, or some other preestablished pattern to provide a desired triggering effect of the encapsulated odor control components.

In one or more embodiments, the thermoplastic bag 500 only includes one encapsulated odor control component (i.e., the encapsulated odor control components 508, 510 include the same odor-control active and encapsulants). In some embodiments, however, the thermoplastic bag 500 includes multiple encapsulated odor control components. For example, the encapsulated odor control components 508, 510 can each include a different odor-control active encapsulated within a plurality of encapsulants. The different odor-control actives can provide different forms of odor control (e.g., one odor-control active mask malodors with a fragrance while the other odor-control active neutralizes). Additionally, or alternatively, the encapsulated odor control components 508, 510 can include encapsulants that are configured to activate based on different triggers. For example, the encapsulants of the encapsulated odor control components 508, 510 can be configured with a different porosity to release different levels of the odor-control active over time (e.g., the encapsulants of the encapsulated odor control component 508 are configured to release a large amount of odor-control active over time while the encapsulants of the encapsulated odor control component 510 are impermeable, preventing the release of odor-control active over time until activated by a physical interaction). Further, though FIG. 5 illustrates the thermoplastic bag 500 having the encapsulated odor control components 508, 510 applied to both of the first sidewall 502 and the second sidewall 504, respectively, the thermoplastic bag 500 can have an encapsulated odor control component applied to only one sidewall in some implementations.

Further, though FIG. 5 illustrates the thermoplastic bag 500 having the encapsulated odor control components 508, 510 disposed on the sidewalls, the thermoplastic bag 500 can have the encapsulated odor control components 508, 510 applied in various other ways. For example, in some implementations, the thermoplastic bag 500 has the encapsulated odor control component 508 applied to an upper portion of the thermoplastic bag 500 (e.g., on an upper portion of one or both of the first and second sidewalls 502, 504). Further, the thermoplastic bag 500 has the encapsulated odor control component 510 applied to a lower portion of the thermoplastic bag 500 (e.g., on a lower portion of one or both of the first and second sidewalls 502, 504). Accordingly, the thermoplastic bag 500 can avoid intermingling the encapsulated odor control components 508, 510 when closed and folded or rolled during manufacturing.

In still further embodiments, the thermoplastic bag includes one encapsulated odor control component (e.g., one of the encapsulated odor control components 508, 510) and further includes a neat oil application of an odor-control active. For example, the encapsulated odor control component and the neat oil application can be disposed on different sidewalls of the thermoplastic bag 500 or on different portions of the same sidewall(s) (e.g., the neat oil application is disposed on an upper portion of one or both sidewalls while the encapsulated odor control component is disposed on a lower portion of one or both sidewalls).

Figure 6:
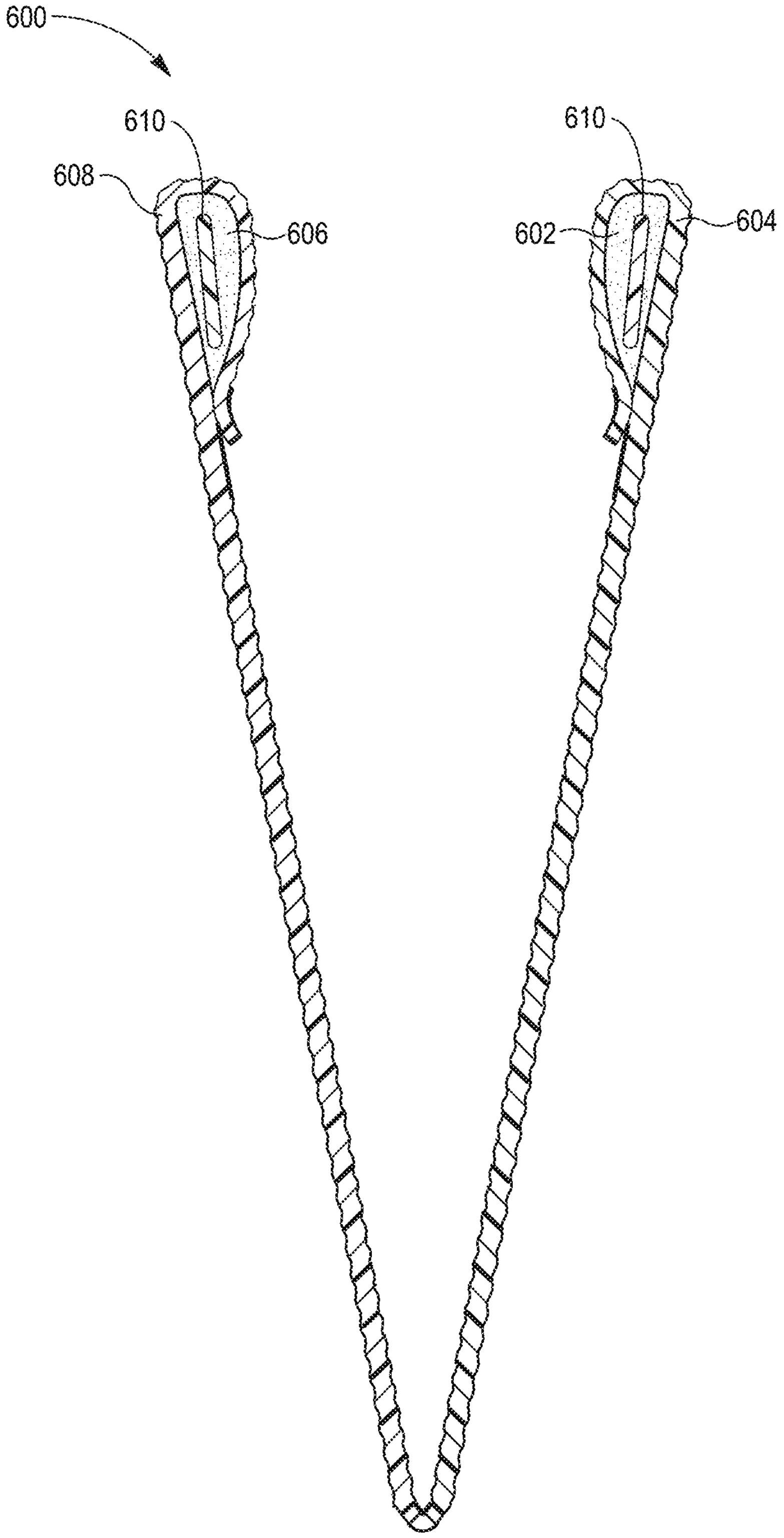
FIG. 6 illustrates side cross-sectional view of another thermoplastic bag having an encapsulated odor control component in accordance with one or more embodiments.

FIG. 6 illustrates a side cross-sectional view of a thermoplastic bag 600 having an encapsulated odor control component disposed thereon in accordance with one or more embodiments. As shown in FIG. 6, the thermoplastic bag 600 includes the encapsulated odor control component 602 disposed within a first hem 604 and the encapsulated odor control component 606 disposed within a second hem 608 of the thermoplastic bag 600. In one or more embodiments, the encapsulated odor control components 602, 606 include the same encapsulated odor control component. In some embodiments, the encapsulated odor control components 602, 606 include different encapsulated odor control components as discussed with reference to FIG. 5.

By disposing the encapsulated odor control component within the hems, the thermoplastic bag 600 can include encapsulated odor control component applications that are not consumer friendly (e.g., not visually attractive, sticky, oily, powder, etc.) as will be discussed in more detail with regards to FIGS. 7A-7B. In particular, positioning the encapsulated odor control component within the hems can help ensure that a user does not come into direct contact with the encapsulated odor control component.

Further, by disposing the encapsulated odor control component within the hems, the thermoplastic bag 600 can be configured to cause the encapsulants to activate and release the odor-control active in response to various physical interactions. For example, as shown in FIG. 6, the thermoplastic bag 600 includes a drawstring 610 positioned within the first hem 604 and the second hem 608. Accordingly, the encapsulants of the encapsulated odor control components 602, 606 can be configured to delay a release of the odor-control active until activated by a physical interaction with the drawstring 610. For example, when the drawstring 610 moves through the first hem 604 and/or the second hem 608, the drawstring 610 can cause a friction within the hem(s). In response to the friction, the encapsulants of the encapsulated odor control components 602, 606 can activate to release the odor-control active.

As another example, in one or more embodiments, the drawstring 610 includes a plurality of ribs and a plurality of web areas (e.g., created using a cold formation technique or using the SELF'ing intermeshing rollers 202, 204). Further, the encapsulated odor control components 602, 606 can be disposed across the plurality of ribs and the plurality of web areas of the drawstring 610. Accordingly, the drawstring 610 can be configured to cause the encapsulants of the encapsulated odor control components 602, 606 to activate in response to a strain applied to the drawstring 610. Further in some embodiments, the plurality of ribs and the plurality of web areas are configured to cause the encapsulants to activate in phases as discussed above with reference to FIG. 3B.

Figure 7A:
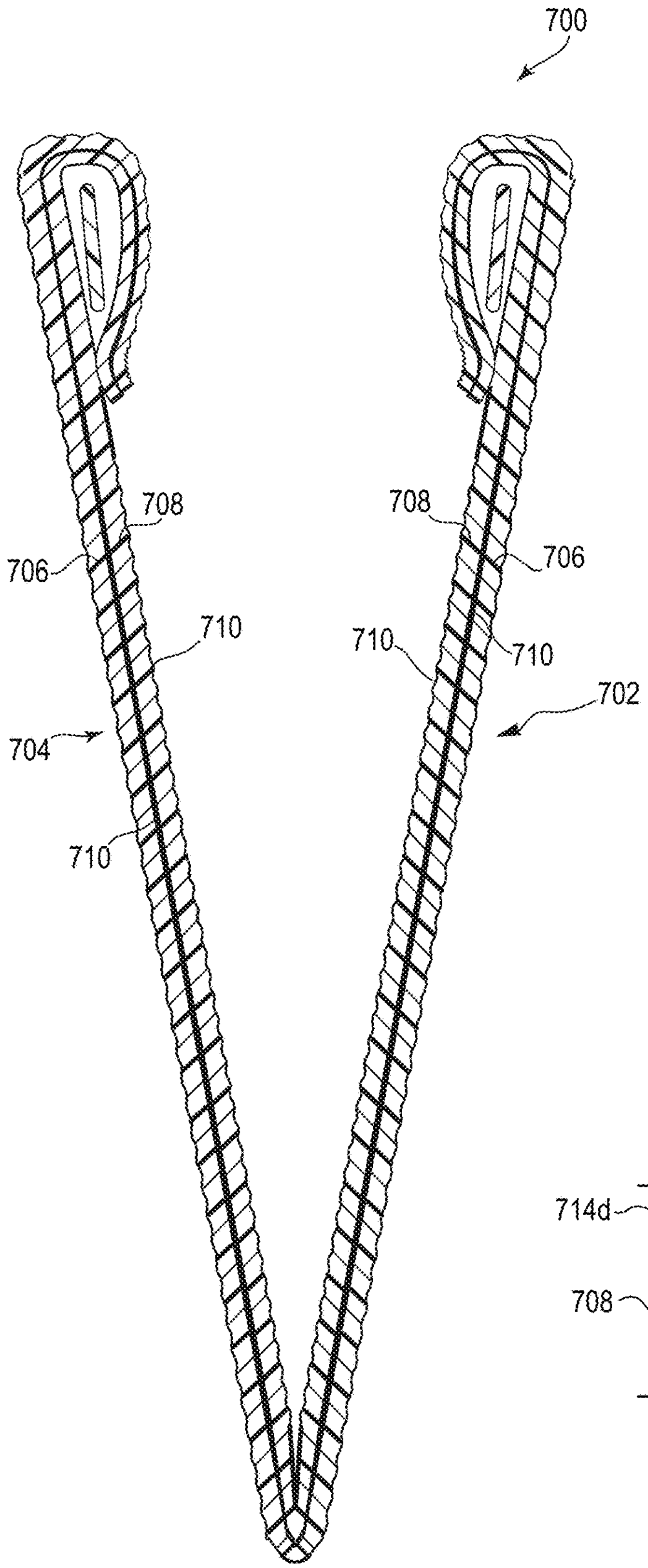
FIG. 7A illustrates a side cross-sectional view of yet another thermoplastic bag having an encapsulated odor control component in accordance with one or more embodiments.

FIG. 7A is a side cross-sectional view of a thermoplastic bag 700. FIG. 7B is an enlarged view of the side cross-sectional view of the thermoplastic bag 700 of FIG. 7A. Referring to FIGS. 7A and 7B together, each of the first and second sidewalls 702, 704 of the thermoplastic bag 700 includes multiple layers of thermoplastic film. In particular, each of the first and second sidewalls 702, 704 includes a first film 706 and a second film 708. The thermoplastic bag 700 further comprises an encapsulated odor control component 710 disposed on one or more of the first and second films 706, 708. When disposed within a receptacle (e.g., trash can), the first film 706 of each of the first and second sidewalls 702, 704 (referred to herein collectively as "the first film 706") of the thermoplastic bag 700 may face (e.g., be oriented adjacent and proximate to) the receptacle, and the second film 708 of each of the first and second sidewalls 702, 704 (referred to herein collectively as "the second film 708") may face (e.g., at least partially define) the interior of the of the thermoplastic bag 700.

The first and second films 706, 708 may include films such as any of the films described above. As mentioned briefly above, the encapsulated odor control component 710 may be disposed on one or more of the first film 706 and the second film 708. Specifically, the first and second films 706, 708 may be at least partially dosed with the encapsulated odor control component 710. In some embodiments, the encapsulated odor control component 710 is disposed between the first and second films 706, 708. As used herein, the term "between," when referring to the encapsulated odor control component 710 and the first and second films 706, 708, means that the encapsulated odor control component 710 is disposed at least partially within a space separating at least a portion of the first film 706 and at least a portion of the second film 708. Thus, the encapsulated odor control component 710 can be disposed on one or more of the first and second films 706, 708 (e.g., on a side of the first and second films 706, 708 facing the space separating the first and second films 706, 708 from each other). Furthermore, the encapsulated odor control component 710 can be disposed at least partially in (e.g., at least partially embedded in) one or more of the first and second films 706, 708.

In some embodiments, the encapsulated odor control component 710 can at least substantially fully span an area between the first film 706 and the second film 708. In other words, the encapsulated odor control component 710 can at least substantially fully span a length and width of the first and second films 706, 708. In other embodiments, the encapsulated odor control component 710 may be disposed between only portions of the first and second films 706, 708. In other words, the encapsulated odor control component 710 may not be continuous and may span only portions of the area between the first film 706 and the second film 708. In additional embodiments, the encapsulated odor control component 710 is included in the first and second films 706, 708 (via inclusion in master batch used to form the first and second films 706, 708) in addition to being disposed between the first and second films 706, 708.

In some embodiments, the first and second sidewalls 702, 704 include an air gap 712 between the first and second films 706, 708 that works in conjunction with the encapsulated odor control component 710. In one or more embodiments, the air gap 712 provides a means of trapping malodor. For example, malodor can pass into the air gap 712 and be at least partially trapped within the air gap 712. Thus, the air gap 712 can reduce or prevent malodor from passing through the outer film (i.e., the first film 706) of the thermoplastic bag 700. Additionally, one or more embodiments include the encapsulated odor control component 710 within the air gap 712 that can operate to release an odor-control active. Having the encapsulated odor control component 710 within the air gap 712 can allow for a further delay in odor control as the odor-control active would have to first penetrate the inner film (i.e., the second film 708). Furthermore, one or more embodiments involve using the air gap 712 to alter the pH of odoriferous species and mitigate formation of odor causing agents. In some implementations, such as when the encapsulated odor-control component 710 is moisture activated, moisture (e.g., water vapor particles) can pass into the air gap 712 to activate the encapsulated odor control component 710.

The air gap 712 can provide an area for disposition of the encapsulated odor control component 710 that conceals the encapsulated odor control component 710. Thus, one or more embodiments includes an encapsulated odor control component that is unsuitable for use in an unconcealed portion of a bag. For example, the encapsulated odor control component 710 between the first and second films 706, 708 can comprise an encapsulated odor control component 710 that lacks aesthetically pleasing characteristics generally desired by consumers. In another embodiment, the encapsulated odor control component 710 comprises negative effects to a consumer, such as skin irritation issues, dust inhalation issues, or other negative effects when combined with consumer interaction. In another embodiment, the encapsulated odor control component 710 is disposed in a wet (i.e., liquid) application that can have a negative effect for users of the bag. The air gap 712 can prevent a user from touching or accessing such wet encapsulated odor control components.

Additionally, the ability to place encapsulated odor control components in between layers is helpful in preserving synergy. For example, the ability to place an encapsulated odor control component in the air gap 712 between the first and second films 706, 708 can facilitate higher levels of encapsulated odor control component dosing without exposing a user to an oily (or other undesirable) feel inside the bag.

Furthermore, in some embodiments, the location where the encapsulated odor control component 710 is disposed between the first film 706 and the second film 708 may be selected based on where the malodor particles will be located relative to the thermoplastic bag 700. For example, the encapsulated odor control component 710 may be disposed between the first film 706 and the second film 708 at the bottom area of the thermoplastic bag 700 (e.g., a portion of the bag most likely to be exposed to malodor molecules). Furthermore, in some embodiments, the one or more substances of the encapsulated odor control component 710 may be selected based on where the encapsulated odor control component 710 will be located relative to the thermoplastic bag 700.

Figure 7B:
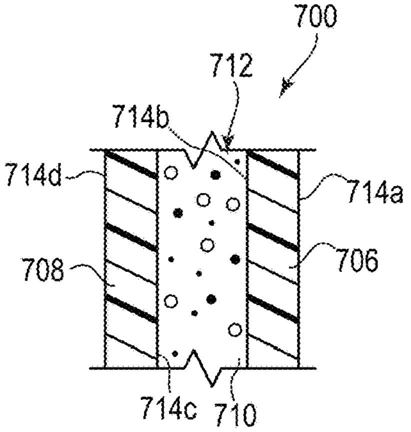
FIG. 7B illustrates an enlarged partial side cross-sectional view of a sidewall of the thermoplastic bag of FIG. 7A.

As shown in FIGS. 7A and 7B, the inner surface 714*d* of the thermoplastic bag 700 can have a first surface area. In some embodiments, the inner surface 714*d* is the only surface upon which encapsulated odor control components are applied. One will appreciate in light of the disclosure herein that the thermoplastic bag 700 includes additional surfaces 714*b* and 714*c* (i.e., the surfaces of the first and second films 706, 708 facing each other and forming the air gap 712). Thus, in one or more embodiments, the thermoplastic bag 700 can have the encapsulated odor control component 710 applied to a total surface area that is greater than the surface area of the inside layer of the thermoplastic bag 700 (i.e., by applying the encapsulated odor control component 710 to surfaces 714*a*, 714*b*, and/or 714*c*).

In one or more embodiments, the encapsulated odor control component 710 may comprise a bonding layer. In other words, the encapsulated odor control component 710 may at least partially bond the first film 706 to the second film 708. For example, the encapsulated odor control component 710 may include one or more of an adhesive, glue, tackifier, tapes, or any other known material for bonding films together.

Though not specifically shown in FIGS. 7A-7B, in one or more embodiments, the encapsulated odor control component 710 is disposed between layers of thermoplastic film of the thermoplastic bag 700 (e.g., between the first and second films 706, 708) in particular locations. For example, in some implementations, the encapsulated odor control component 710 is disposed between layers of thermoplastic film in one or more of the hems of the thermoplastic bag 700. Accordingly, the thermoplastic bag 700 can provide additional odor control near the top of the thermoplastic bag 700, such as when the thermoplastic bag 700 is stretched at the top for placement in a trash receptacle or when the thermoplastic bag 700 is closed for disposal.

Figure 8:
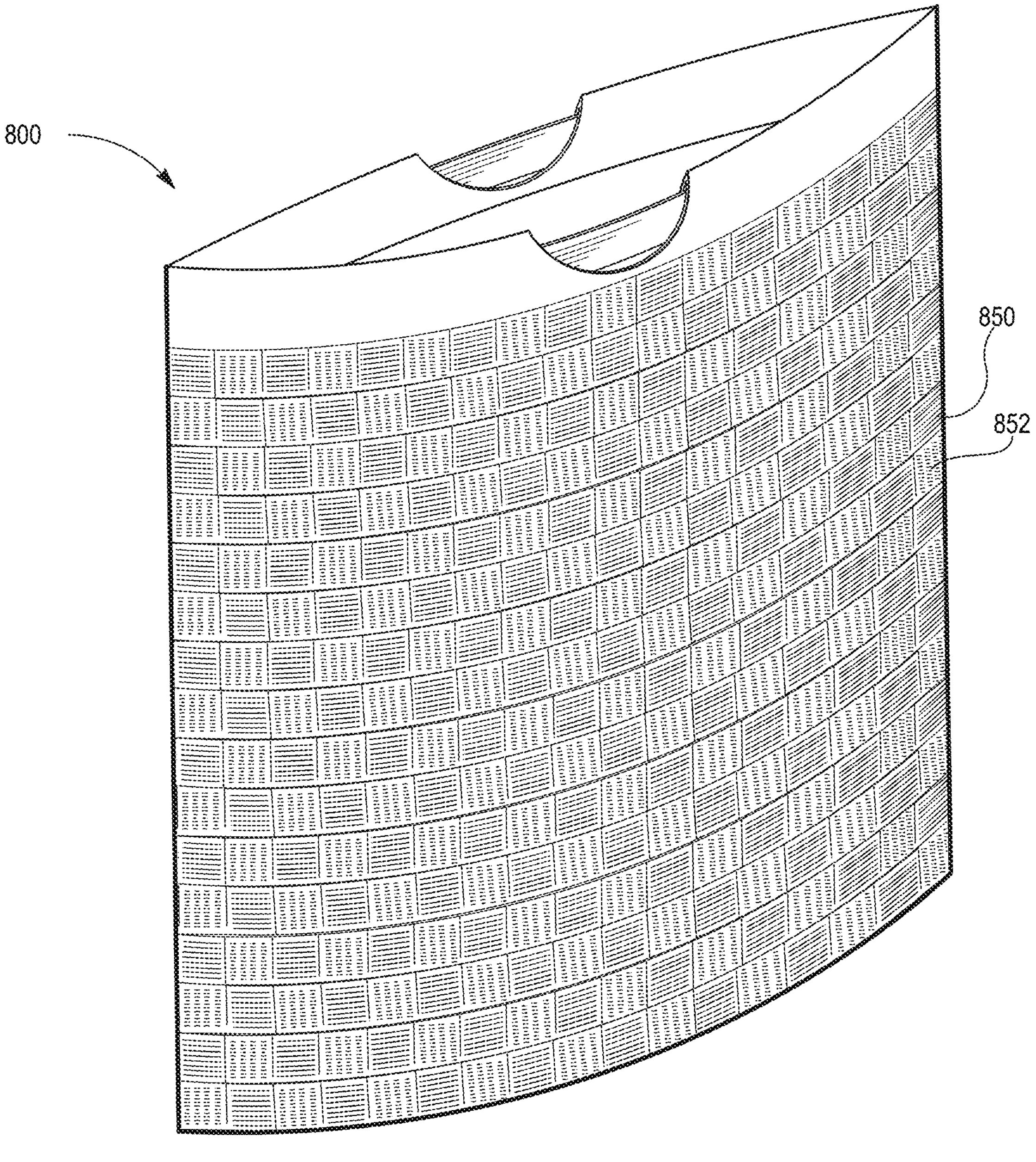
FIG. 8 illustrates a perspective view of thermoplastic bag having a pattern in accordance with one or more embodiments.

FIG. 8 illustrates another thermoplastic bag 800 with sidewalls that are SELF'ed. The thermoplastic bag 800 can include the same structure as one of the thermoplastic bags 500, 600, 700 (including the encapsulated odor control component) albeit with a different pattern of intermittent bonds and thinner webs and thicker ribs. In particular, the thermoplastic bag 800 may include a single pattern of raised like elements arranged in a checkerboard pattern. The pattern can comprise a micro pattern of raised rib-like elements 852 and a macro pattern of raised rib-like elements 850. In one or more embodiments, the encapsulated odor control component is positioned on the macro patterns. In alternate embodiments, the encapsulated odor control component is positioned on the micro patterns. In still further embodiments, the encapsulated odor control component is positioned on both the micro and macro patterns.

Figure 9A:
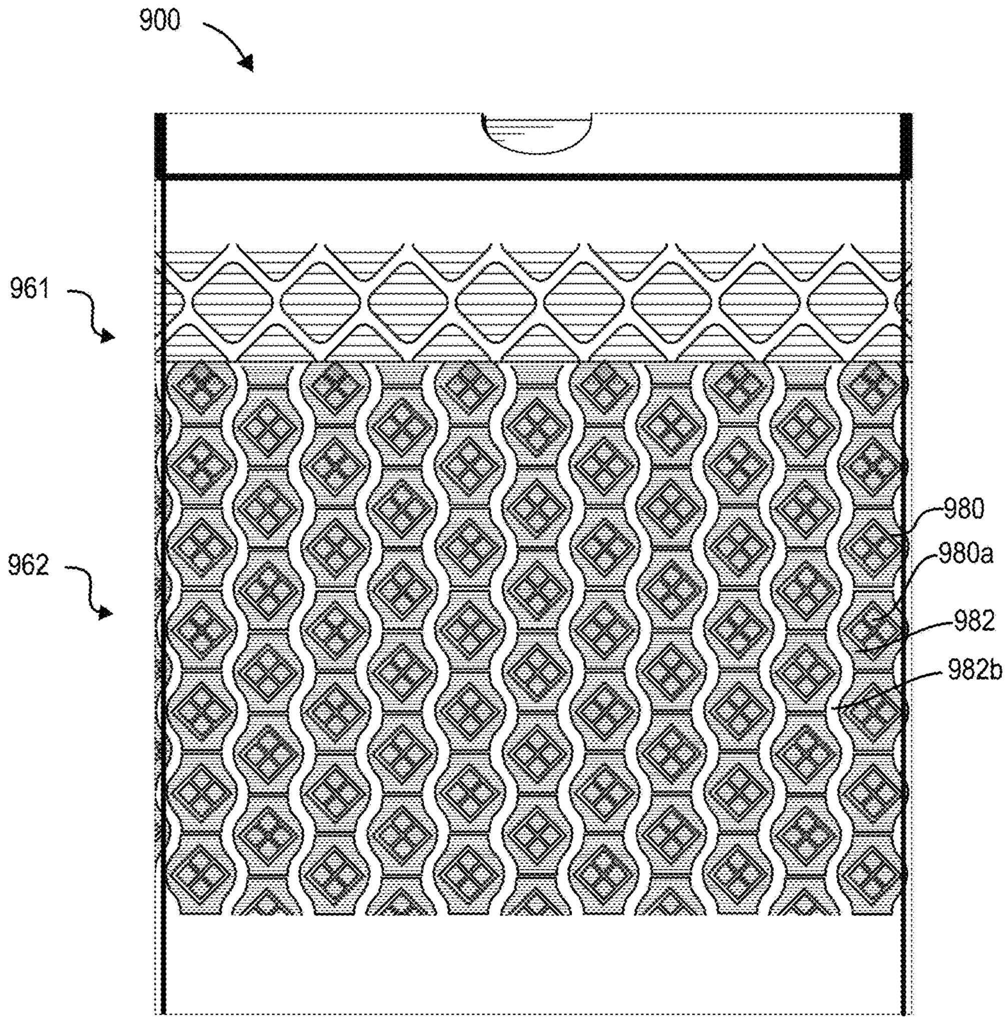
FIGS. 9A-9B illustrate a front view of a thermoplastic bag having another pattern in accordance with one or more embodiments.
Figure 9B:
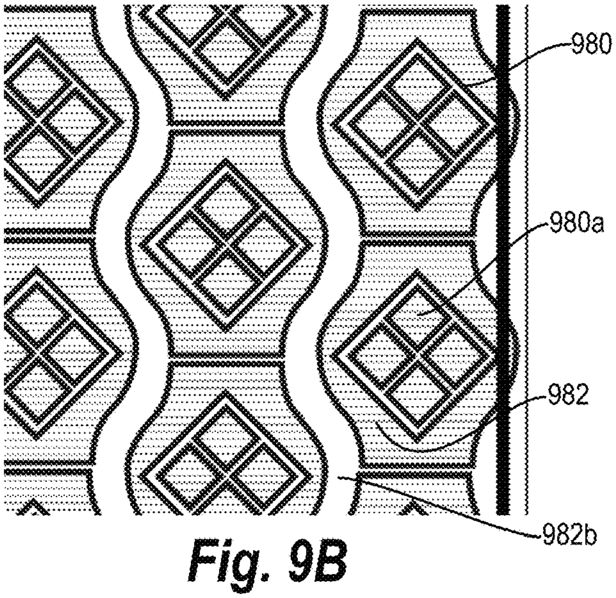

FIG. 9A shows another thermoplastic bag 900 similar to the thermoplastic bags 500, 600, 700. FIG. 9B is an enlarged view of a portion of the thermoplastic bag 900. Referring to FIGS. 9A and 9B together, one or more of the sidewalls of the thermoplastic bag 900 have a first plurality of raised rib-like elements 982 in a macro pattern (e.g., a bulbous pattern) and a second plurality of raised rib-like elements 980*a* in a micro pattern (e.g., four diamonds) in a first middle portion 962. As shown, the second plurality of raised rib-like elements 980*a* in the micro pattern are nested within the macro patterns. Furthermore, the thermoplastic bag 900 includes web areas 980, 982*b*. The web areas 980, 982*b* can surround the micro and the macro patterns of raised rib-like elements. The plurality of web areas 980, 982*b* comprise areas in which the first layer and the second layer are separated to form intermittent bonding between the layers (i.e., the inner bag and the outer bag). Furthermore, as shown by FIGS. 9A and 9B, the web areas 982*b* are arranged in a sinusoidal pattern. In one or more embodiments, the encapsulated odor control component is positioned on the web areas 982*b*. In some implementations, the encapsulated odor control component is additionally or alternatively positioned on the first plurality of raised rib-like elements 982 in the macro pattern and/or the second plurality of raised rib-like elements 980*a* in the micro pattern. Thus, the thermoplastic bag 900 can provide phased release of the odor-control active from the encapsulated odor control component in response to different activation triggers, such as different levels of strain applied to the thermoplastic bag 900.

Additionally, FIGS. 9A and 9B illustrates that the thermoplastic bags described herein can include areas with different patterns. In particular, FIG. 9A illustrates an upper portion 961 of the thermoplastic bag 900 including a fenced diamond pattern. The fenced diamond pattern can comprise raised-rib-like elements arranged in diamond patterns where the intersections of the sides of the diamond are rounded rather than ending in corners. The fenced diamond pattern can also comprise areas in which the first layer and the second layer are separated to form intermittent bonding between the layers (i.e., the inner bag and the outer bag). In one or more embodiments, the encapsulated odor control component is positioned on upper portion 961.

In one or more embodiments, the encapsulated odor control component is positioned on the raised-rib-like elements of the upper portion 961 and the raised-rib-like elements of the middle portion 962. Placing the encapsulated odor control component on different areas can cause the encapsulated odor control component to activate at different times. For example, the encapsulated odor control component on the raised-rib-like elements of the upper portion 961 can activate (i.e., be triggered) as the raised-rib-like elements of the upper portion 961 are stretched and expanded as the thermoplastic bag 900 (and the upper portion 961 in particular) is stretched around the top of a trash can or other receptacle. Similarly, the encapsulated odor control component on the raised-rib-like elements of the middle portion 962 can activate (i.e., be triggered) as the raised-rib-like elements of the middle portion 962 are stretched and expanded as the thermoplastic bag 900 (and the middle portion 962 in particular) is stretched during loading of the thermoplastic bag 900 with trash.

Figure 10A:
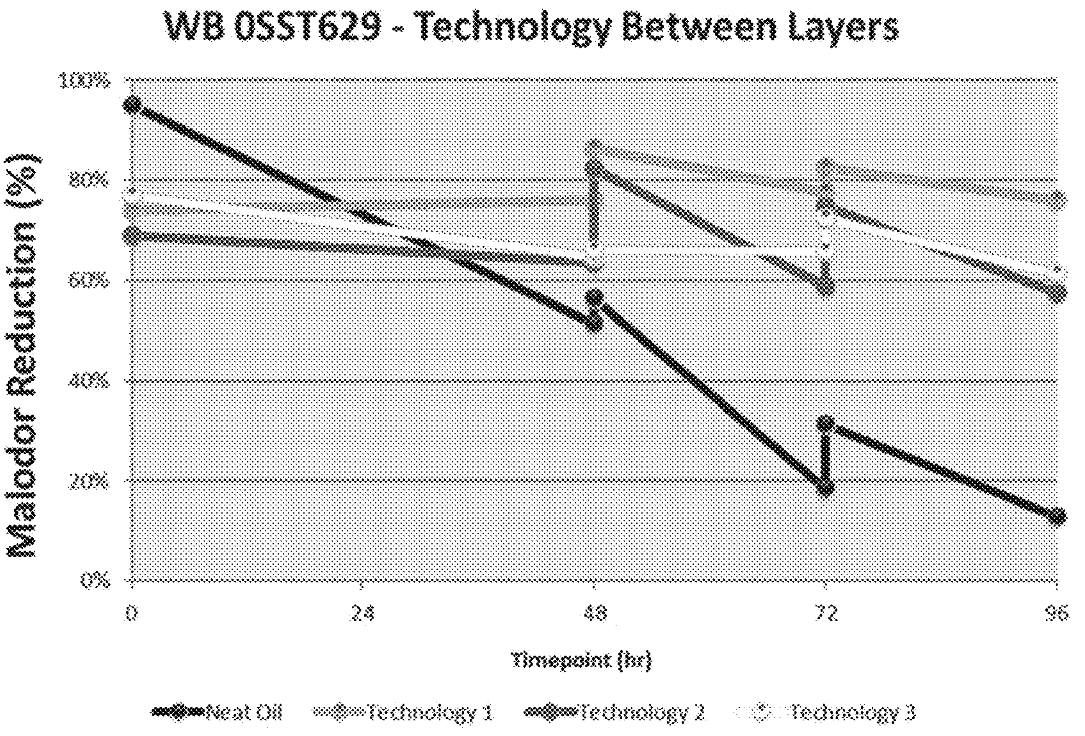
FIGS. 10A-10B illustrate graphs reflecting experimental results regarding the effectiveness of thermoplastic bags having the encapsulated odor control component disposed thereon in accordance with one or more embodiments.
Figure 10B:
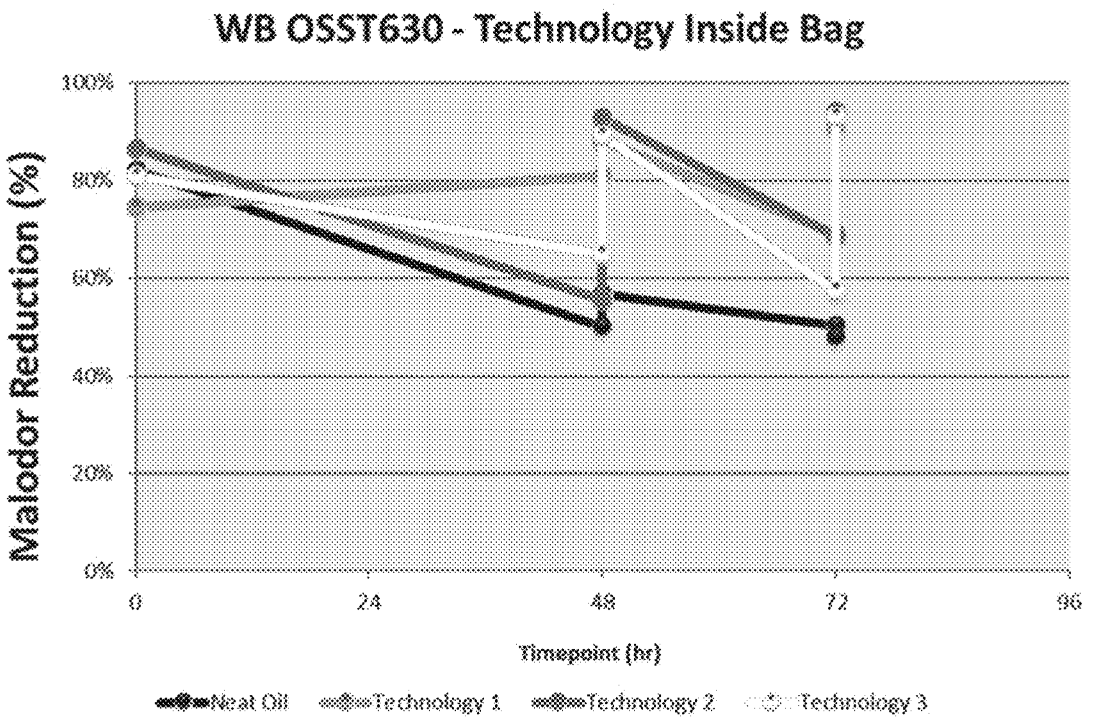

As indicated above, application of the encapsulated odor control component allows thermoplastic bags to provide improved odor control. Researchers conducted studies to evaluate the effectiveness of thermoplastic bags having an encapsulated odor control component applied thereon. FIGS. 10A-10B illustrate graphs reflecting experimental results regarding the effectiveness of thermoplastic bags utilizing an encapsulated odor control component to provide odor control in accordance with one or more embodiments.

The researchers compared the performance of thermoplastic bags utilizing various embodiments of an encapsulated odor control component applied thereon (labeled "Technology 1," "Technology 2," and "Technology 3" where each technology included a different fragrance). In particular, the various embodiments of the encapsulated odor control component include encapsulants having various levels of porosity that would configure the encapsulants to release a portion of the odor-control active over time. For example, the encapsulants for "Technology 1" were configured with a medium level of porosity.

The researchers further compared the performance of the thermoplastic bags having the encapsulated odor control component with a thermoplastic bag utilizing a neat oil application for odor control. The researchers added a combination of malodor sources—the same combination—to each of the thermoplastic bags and measured reduction in malodor provided by each of the thermoplastic bags via a panel. In particular, at a given time period, the panelists measured the malodor within a thermoplastic bag, activated the odor control application (e.g., the encapsulated odor control component or the neat oil application) within the thermoplastic bag (e.g., by applying a strain to the thermoplastic bag) and then re-measured the malodor (e.g., to determine a reduction in the malodor present due to activation).

The thermoplastic bags represented in FIG. 10A had the corresponding odor control application disposed between separate layers of the thermoplastic bag. The thermoplastic bags represented in FIG. 10B had the corresponding odor control application disposed inside the bag (i.e., disposed on an interior surface). As can be shown in both FIGS. 10A and 10B, the thermoplastic bags having the encapsulated odor control component disposed thereon provide improved odor control compared to the thermoplastic bag having the neat oil application. In particular, the thermoplastic bags with the encapsulated odor control component provided a significantly improved reduction in malodor. Further, the thermoplastic bags with the encapsulated odor control component provided a significant reduction in malodor at a given point in time after the encapsulants were activated to release the odor-control active. It should be noted that any reduction in malodor after "activation" of the neat oil application can be attributed to a rise of the odor-control active located at the bottom of the thermoplastic bag to the headspace after pushing down into the thermoplastic bag to "activate" the odor control. In other words, the neat oil application is not activated as the odor-control active is exposed upon application.

Figure 11:
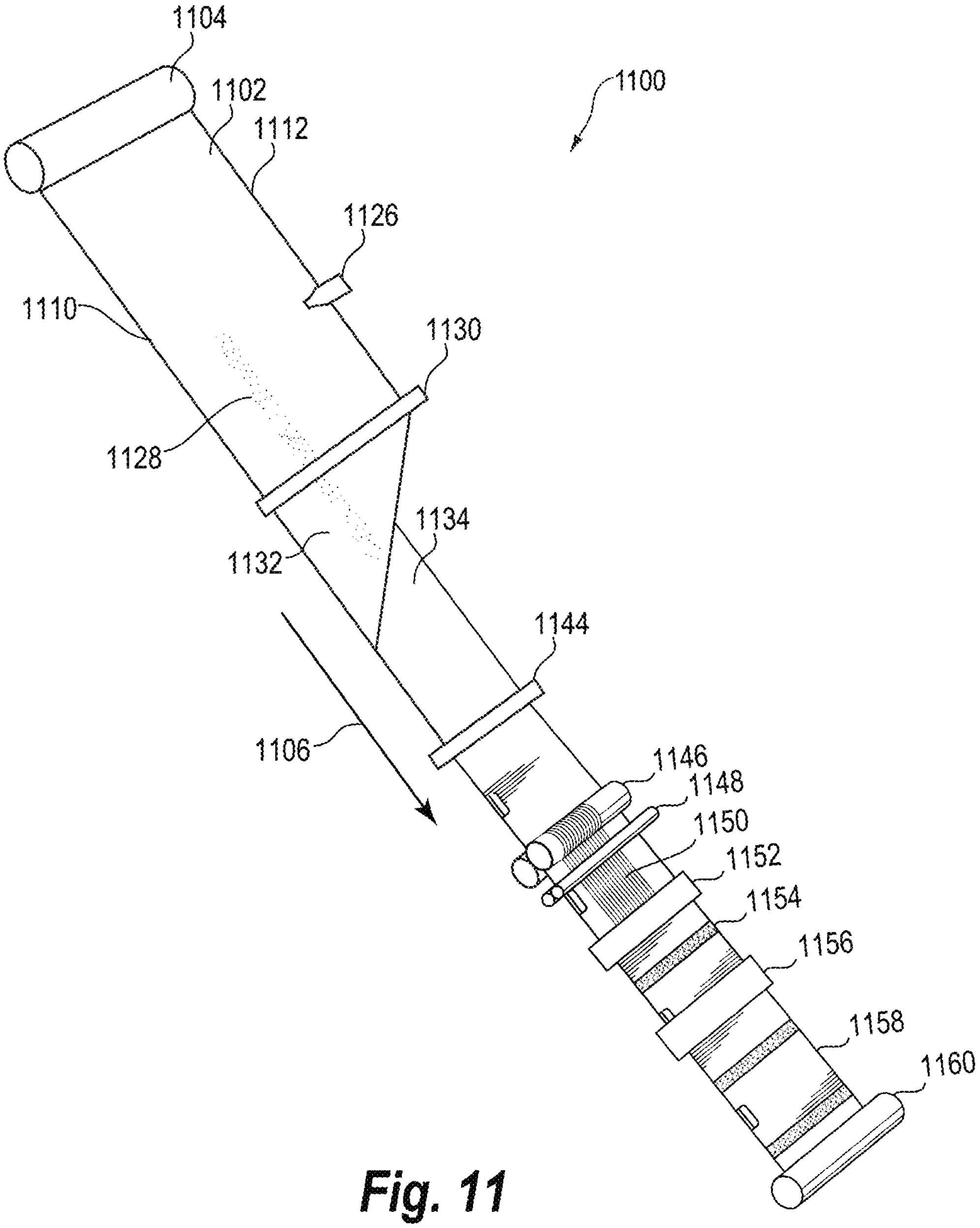
FIG. 11 illustrates a schematic diagram of a manufacturing process for producing thermoplastic bags having an encapsulated odor control component in accordance with one or more embodiments.
Figure 12:
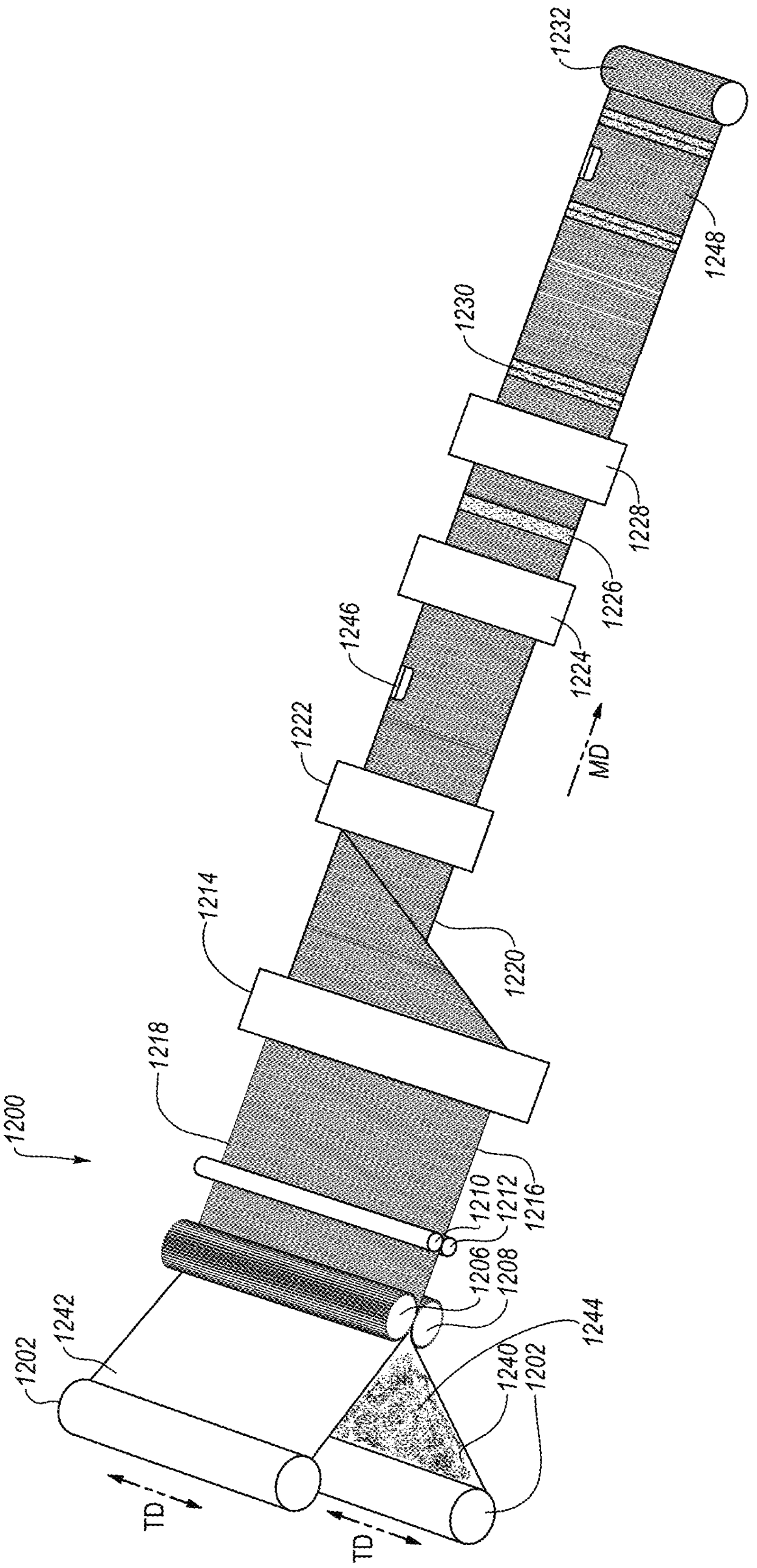
FIG. 12 illustrates a schematic diagram of another manufacturing process for producing thermoplastic bags having an encapsulated odor control component in accordance with one or more embodiments.

One or more implementations of the present invention can also include methods of forming thermoplastic bags. FIGS. 11-12 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Referring to FIG. 11 a schematic of an implementation for high-speed automated manufacturing of bags process 1100 is shown. In the illustrated implementation, the process 1100 may begin by unwinding a web 1102 of thermoplastic sheet material from a roll 1104 and advancing the web along a machine direction 1106. The unwound web 1102 may have a rectangular profile including a width that is perpendicular to the machine direction 1106 as measured between a first edge 1110 and an opposite second edge 1112. In other manufacturing environments, the process may involve extruding the web 1102 using a thermoplastic production process.

After unwinding the web 1102, the process 1100 can involve dispensing a substance 1128 containing an encapsulated odor control component and an aqueous carrier using a dispenser 1126 either inside the bag or between the layers. In one or more embodiments, the dispenser 1126 sprays the substance 1128, rather than micro-droplets, to increase the surface area to which the substance 1128 is applied. Additionally, by applying the substance 1128 via a spray, a thinner layer of active material is applied allowing for quicker drying of the aqueous carrier of the encapsulated odor control component. In some implementations, the dispenser 1126 sprays the substance 1128, atomizing the encapsulated odor control component for application. In some implementations, the dispenser 1126 sprays the substance 1128 intermittently to avoid applying the substance 1128 where the side seals need to be formed (i.e., for better adhesion of the side seals). In one or more embodiments, the substance 1128 is additionally, or alternatively, applied using micro-droplets, a roller, or a slot cast.

In some implementations, the process 1100 utilizes alternative methods for applying the substance 1128 containing the encapsulated odor control component. For example, the process 1100 can apply the substance 1128 via prills, coacervation/emulsion, dripping/gelation, or coating.

In one or more embodiments, the substance 1128 includes a liquid application, a powder application or any other application discussed above. In one or more embodiments, the substance 1128 is applied with a deposition aid to improve adhesion of the substance without making the bag sticky when a consumer tries to open the bag. To illustrate, the deposition aid can include a water-soluble resin/binder, such as hydroxypropyl methylcellulose (HPMC), polyethylene glycol, polyethylene oxide, polyvynilpyrrolidone, alginate, polyvinyl alcohol, celluloses (e.g., hydroxypropyl cellulose, carboxymethyl cellulose, hydroxypropyl methylcellulose) or pullulan. In some instances, the deposition aid includes water-insoluble resins/binders (e.g., nitrocellulose, CAB, acrylates, urethanes, etc.). Such a deposition aid can be used, for instance, in combination with encapsulants triggered to release their odor-control active in response to contact with water. In some implementations, the deposition aid includes one or more hot melts or acrylates.

In some embodiments, the substance 1128 is applied with an ultraviolet (UV) indicator to provide visual evidence of the spray pattern (e.g., under a black light) or to help identify a clogged nozzle during manufacturing. In some implementations, the substance 1128 is applied with a color indicator so that a consumer can visually identify a location of the encapsulated odor control component. For example, the color indicator can include an oil soluble dye encapsulated within the encapsulants of the encapsulated odor control component, which allows a consumer to see where activation is occurring. In some embodiments, the color indicator includes a water-soluble dye that is mixed into the aqueous phase of the encapsulated odor control component to show the consumer where the encapsulated odor control component has been applied.

As mentioned above, the process 1100 can be modified so that the act of applying the substance 1128 containing the encapsulated odor control component can occur earlier or later than what is shown in FIG. 11. For example, in one or more embodiments, the substance 1128 containing the encapsulated odor control component (or the encapsulated odor control component itself) can be coextruded with the web 1102 using the thermoplastic production process.

Subsequently, the process 1100 can include a folding process 1130 that involves folding the web 1102 about its width and in-line with the machine direction 1106 to provide adjacent first and second folded halves 1132, 1134. The folding of the web 1102 may cause the second edge 1112 to move adjacent to the first edge 1110 such that the two edges correspond to the opened top edge of the finished bag. The mid-width portion of the web 1102 may correspond to the reinforced bottom edge portion of the finished bag which may move in parallel with the machine direction 1106. Additionally, the folded halves 1132, 1134 of the web 1102 correspond to the first and second sidewalls of the finished bag. As suggested above, applying the substance 1128 containing the encapsulated odor control component can occur after the folding process 1130. For example, in some implementations, the process 1100 utilizes a dispenser (e.g., the dispenser 1126) that inserts into an open portion of the folded bag and applies the substance 1128 accordingly.

Additional processing steps may be applied to produce the finished bag. In particular, the process 1100 can include a draw tape insertion process 1144 that involves inserting a draw tape into the first edge 1110 and the second edge 1112 of the web 1102.

Optionally, to bond (and optionally stretch) the halves of the web, the processing equipment may include a pair of intermeshing rollers 1146 such as those described herein above. The folded halves 1132, 1134 may be advanced along the machine direction 1106 between the intermeshing rollers 1146, which may be set into rotation in opposite rotational directions to impart the resulting bonding pattern 1150. To facilitate patterning of the folded halves 1132, 1134, the intermeshing rollers 1146 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the intermeshing rollers 1146 may be arranged so that they are co-extensive with or wider than the width of the folded halves 1132, 1134. In one or more implementations, the bonding pattern 1150 created by intermeshing rollers 1146 may extend from proximate the folded edge to the adjacent edges 1110, 1112. To avoid imparting the bonding pattern 1150 onto the portion of the folded halves 1132, 1134 that includes the draw tape, the corresponding ends of the intermeshing rollers 1146 may be smooth and without the ridges and grooves. Thus, the adjacent edges 1110, 1112 and the corresponding portion of the folded halves 1132, 1134 proximate those edges that pass between the smooth ends of the intermeshing rollers 1146 may not be imparted with the bonding pattern 1150.

The processing equipment may include pinch rollers 1148 to accommodate the width of the folded halves 1132, 1134. To produce the finished bag, the processing equipment may further process the folded halves 1132, 1134. For example, to form the parallel side edges of the finished bag, the folded halves 1132, 1134 may proceed through a sealing operation 1152 in which heat seals 1154 may be formed between the folded edge and the adjacent edges 1110, 1112. The heat seals may fuse together the adjacent folded halves 1132, 1134. The heat seals 1154 may be spaced apart along the folded halves 1132, 1134 and in conjunction with the folded outer edge may define individual bags. The heat seals 1154 may be made with a heating device, such as, a heated knife or a sealing bars as described in greater detail below. A perforating operation 1156 may perforate the heat seals 1154 with a perforating device, such as, a perforating knife so that individual bags 1158 may be separated from the web 1102. In one or more implementations, the folded halves 1132, 1134 may be folded one or more times before the folded halves 1132, 1134 may be directed through the perforating operation. The folded halves 1132, 1134 embodying the individual bags 1158 may be wound into a roll 1160 for packaging and distribution. For example, the roll 1160 may be placed in a box or a bag for sale to a customer.

In one or more implementations of the process 1100, a cutting operation may replace the perforating operation 1156. The web is directed through a cutting operation which cuts the folded halves 1132, 1134 at location into individual bags 1158 prior to winding onto a roll 1160 for packaging and distribution. For example, the roll 1160 may be placed in a box or bag for sale to a customer. The bags may be interleaved prior to winding into the roll 1160. In one or more implementations, the folded halves 1132, 1134 may be folded one or more times before the folded web is cut into individual bags. In one or more implementations, the individual bags 1158 may be positioned in a box or bag, and not onto the roll 1160.

FIG. 12 illustrates an exemplary embodiment of a manufacturing process for making multi-layer thermoplastic film (e.g., the first and second films 1240, 1242) having the encapsulated odor control component 1244 (e.g., a substance containing the encapsulated odor control component 1244) disposed therein and then producing multi-layer thermoplastic bags therefrom. According to the process 1200, a first film 1240 and a second film 1242 may be unwound from stock rolls 1202, respectively, and directed along a machine direction MD. Alternatively, the first and second films 1240, 1242 may be extruded directly from one or more extrusion towers rather than stock rolls 1202.

The encapsulated odor control component 1244 (e.g., one or more substances containing the encapsulated odor control component 1244) may be applied to one or more of the first and second films 1240, 1242 on the inner sides of the first and second films 1240, 1242 (e.g., the sides of the first and second films 1240, 1242 that will be bonded together) prior to bonding the first and second films 1240, 1242. The encapsulated odor control component 1244 may be applied through one or more of laminating, dusting, spraying, rolling, and any other method known in the art for applying substances to films. In one or more embodiments, the encapsulated odor control component 1244 (or a substance containing the encapsulated odor control component 1244) is coextruded with the first and second films 1240, 1242.

After the encapsulated odor control component 1244 has been applied to one or more of the first and second films 1240, 1242, the first and second films 1240, 1242 may be passed between a pair of cylindrical intermeshing rollers 1206, 1208 to incrementally stretch and lightly laminate the initially separate first and second films 1240, 1242 to create un-bonded regions and bonded regions in at least one section of a multi-layer film (i.e., eventual sidewall of the multi-layer bag). The intermeshing rollers 1206, 1208 shown in FIG. 12 may have a construction similar to that of any of the intermeshing rollers described in U.S. Pat. No. 8,603,609 or those shown above with reference to FIG. 2. The rollers 1206, 1208 may be oriented such that longitudinal axes of the rollers are perpendicular to the machine direction. Additionally, the rollers 1206, 1208 may rotate about their longitudinal axes in opposite rotational directions. In some embodiments, motors may be provided to power rotation of the rollers 1206, 1208 in a controlled manner. As the first and second films 1240, 1242 pass between the pair of rollers 1206, 1208, the ridges and/or teeth of the rollers 1206, 1208 can form the multi-layer film (i.e., eventual sidewall of the multi-layer bag).

During the manufacturing process 1200, the multi-layer film can also pass through a pair of pinch rollers 1210, 1212. The pinch rollers 1210, 1212 can be appropriately arranged to grasp the multi-layer film.

A folding operation 1214 can fold the multi-layer film to produce the sidewalls of the finished bag. The folding operation 1214 can fold the multi-layer film in half along the transverse direction. In particular, the folding operation 1214 can move a first edge 1216 adjacent to the second edge 1218, thereby creating a folded edge 1220. For example, the process may include the folding operation described in U.S. Pat. No. 8,568,283, the entire contents of which are hereby incorporated by reference in their entirety. Additionally, the folding operation 1214 may form a hem at an eventual top portion of a thermoplastic film.

To produce the finished bag, the processing equipment may further process the folded multi-layer film. In particular, a draw tape operation 1222 can insert a draw tape 1246 into the first edge 1216 and the second edge 1218 of the multi-layer film. Furthermore, a sealing operation 1224 can form the parallel side edges of the finished bag by forming heat seals 1226 between adjacent portions of the folded multi-layer lightly-laminated film. Moreover, the sealing operation 1224 can seal the hem to a sidewall of the eventual thermoplastic bag. The heat seal 1226 may strongly bond adjacent layers together in the location of the heat seal 1226 so as to tightly seal the edges (e.g., produce an at least substantially watertight seal) of the finished bag. The heat seals 1226 may be spaced apart along the folded multi-layer film to provide a desired width to the finished bags. The sealing operation 1224 can form the heat seals 1226 using a heating device, such as, a heated knife.

A perforating operation 1228 may form a perforation 1230 in the heat seals 1226 using a perforating device, such as, a perforating knife. The perforations 1230 in conjunction with the folded outer edge 1220 can define individual bags 1248 that may be separated from the multi-layer film. A roll 1232 can wind the multi-layer lightly-laminated film embodying the finished individual bags 1248 for packaging and distribution. For example, the roll 1232 may be placed into a box or bag for sale to a customer.

In still further implementations, the folded multi-layer lightly-laminated film may be cut into individual bags along the heat seals 1226 by a cutting operation. In another implementation, the folded multi-layer lightly-laminated film may be folded one or more times prior to the cutting operation. In yet another implementation, the side sealing operation 1224 may be combined with the cutting and/or perforation operations 1228.

In further embodiments, the hem of the thermoplastic bag may be ring rolled and/or SELF'ed to form a pattern in the hem. Moreover, the hem of the thermoplastic bag may be ring rolled and/or SELF'ed prior to being folded into a hem shape and/or after being folded into a hem shape.

One will appreciate in view of the disclosure herein that the process 1200 described in relation to FIG. 12 can be modified to omit or expanded acts, or vary the order of the various acts as desired. In particular, the process 1200 can involve placing or applying an encapsulated odor control component such that the encapsulated odor control component is positioned in or around the hem as described below.

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be coextruded so that the layers have a bond strength that provides for delamination prior to film failure to provide similar benefits to those described above. Thus, the described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A thermoplastic film, comprising:

a plurality of ribs;

a plurality of web areas, the plurality of web areas separating and connecting the plurality of ribs, wherein the plurality of web areas is out of plane with the plurality of ribs so as to create recesses between adjacent ribs of the plurality of ribs; and an encapsulated odor control component applied across a surface of the plurality of ribs and the plurality of web areas, the encapsulated odor control component comprising an odor-control active encapsulated within a plurality of encapsulants, wherein:

the plurality of encapsulants are configured to delay a release of the odor-control active until activated; and a positioning of the plurality of encapsulants across the surface of the plurality of ribs and the plurality of web areas are is configured to cause the plurality of encapsulants to activate in phases.

2. The thermoplastic film of claim 1, wherein the plurality of encapsulants are configured to delay the release of the odor-control active until activated in response to a physical interaction applied to the plurality of ribs and the plurality of web areas.

3. The thermoplastic film of claim 2, wherein:
the physical interaction comprises a strain applied to the plurality of ribs and the plurality of web areas; and
the plurality of encapsulants comprises:
a first set of encapsulants disposed on a surface of the plurality of ribs; and
a second set of encapsulants disposed on a surface of the plurality of web areas so that encapsulants of the second set of encapsulants are positioned within the recesses between the adjacent ribs,
wherein a position of the first set of encapsulants relative to a position of the second set of encapsulants is configured to cause:
the first set of encapsulants to activate in a first phase in response to a physical strain applied to the plurality of ribs and the plurality of web areas; and
the second set of encapsulants to activate in a subsequent phase in response to an additional physical strain applied to the plurality of ribs and the plurality of web areas.

4. The thermoplastic film of claim 2, wherein the physical interaction comprises a friction applied to the plurality of ribs and the plurality of web areas.

5. The thermoplastic film of claim 2, wherein the physical interaction applied to the plurality of ribs and the plurality of web areas includes a stretching applied to the plurality of ribs and the plurality of web areas.

6. The thermoplastic film of claim 1, further comprising:
a hem portion of thermoplastic material;
a drawstring within the hem portion of thermoplastic material; and
an additional encapsulated odor control component applied within the hem portion of the thermoplastic material, the additional encapsulated odor control component comprising additional odor-control active encapsulated within an additional plurality of encapsulants, wherein the additional plurality of encapsulants are configured to delay a release of the additional odor-control active until activated by friction caused by movement of the drawstring within the hem portion of thermoplastic material.

7. The thermoplastic film of claim 1, further comprising a plurality of layers of thermoplastic material, the plurality of layers of thermoplastic material comprising the plurality of ribs and the plurality of web areas, wherein the encapsulated odor control component is applied across the plurality of ribs and the plurality of web areas between the plurality of layers of thermoplastic material.

8. The thermoplastic film of claim 1, further comprising at least one of a color indicator or an ultraviolet indicator in association with the encapsulated odor control component, the color indicator or the ultraviolet indicator configured to identify a location of the encapsulated odor control component across the plurality of ribs and the plurality of web areas.

9. The thermoplastic film of claim 8, wherein the color indicator comprises an oil soluble dye encapsulated within the plurality of encapsulants.

10. The thermoplastic film of claim 1, wherein the odor-control active comprises at least one of:
an odor neutralizing agent;
an absorptive agent;
an adsorptive agent;
an antimicrobial agent; or
a fragrance.

11. A thermoplastic bag, comprising:
a first sidewall;
a second sidewall opposite the first sidewall and joined with the first sidewall along a first side edge, an opposite second side edge, and a bottom edge,
wherein at least the first sidewall or the second sidewall comprises:
a plurality of ribs; and
a plurality of web areas, the plurality of web areas separating and connecting the plurality of ribs, wherein the plurality of web areas is out of plane with the plurality of ribs so as to create recesses between adjacent ribs of the plurality of ribs; and
an encapsulated odor control component applied across a surface of the plurality of ribs and the plurality of web areas, the encapsulated odor control component comprising an odor-control active encapsulated within a plurality of encapsulants, wherein:
the plurality of encapsulants are configured to delay a release of the odor-control active until activated; and
a positioning of the plurality of encapsulants across the surface of the plurality of ribs and the plurality of web areas is configured to cause the plurality of encapsulants to activate in phases.

12. The thermoplastic bag of claim 11, further comprising an additional encapsulated odor control component applied to at least the first sidewall or the second sidewall, the additional encapsulated odor control component comprising the odor-control active encapsulated within an additional plurality of encapsulants, wherein the additional plurality of encapsulants are configured to release at least a portion of the odor-control active over time.

13. The thermoplastic bag of claim 11, wherein the plurality of encapsulants are configured to delay the release of the odor-control active until activated in response to a physical interaction applied to the plurality of ribs and the plurality of web areas.

14. The thermoplastic bag of claim 13, wherein:
the physical interaction comprises a strain applied to the plurality of ribs and the plurality of web areas; and
the plurality of encapsulants comprises:
a first set of encapsulants disposed on a surface of the plurality of ribs; and
a second set of encapsulants disposed on a surface of the plurality of web areas so that encapsulants of the second set of encapsulants are positioned within the recesses between the adjacent ribs,
wherein a position of the first set of encapsulants relative to a position of the second set of encapsulants is configured to cause:
the first set of encapsulants to activate in a first phase in response to a physical strain applied to the plurality of ribs and the plurality of web areas; and
the second set of encapsulants to activate in a subsequent phase in response to an additional physical strain applied to the plurality of ribs and the plurality of web areas.

15. The thermoplastic bag of claim 13, wherein the physical interaction comprises a friction applied to the plurality of ribs and the plurality of web areas.

16. The thermoplastic bag of claim 11, at least one of the first sidewall or the second sidewall comprises a first film of thermoplastic material and a second film of thermoplastic material, the first film of thermoplastic material and the second film of thermoplastic material comprising the plurality of ribs and the plurality of web areas, wherein the encapsulated odor control component is applied across the plurality of ribs and the plurality of web areas between the first film of thermoplastic material and the second film of thermoplastic material.

17. The thermoplastic bag of claim 11, further comprising:

a hem associated with at least the first sidewall or the second sidewall;

a drawstring within the hem; and an additional encapsulated odor control component applied within the hem, the additional encapsulated odor control component comprising additional odor-control active encapsulated within an additional plurality of encapsulants, wherein the additional plurality of encapsulants are configured to delay a release of the additional odor-control active until activated by friction caused by movement of the drawstring within the hem.

18. The thermoplastic bag of claim 11, wherein the odor-control active comprises at least one of:

an odor neutralizing agent;

an absorptive agent;

an adsorptive agent;

an antimicrobial agent; or a fragrance.

19. The thermoplastic bag of claim 11, wherein the encapsulated odor control component applied across an interior surface of at least the first sidewall or the second sidewall that faces a bag opening.

20. The thermoplastic bag of claim 11, further comprising at least one of a color indicator or an ultraviolet indicator in association with the encapsulated odor control component, the color indicator or the ultraviolet indicator configured to identify a location of the encapsulated odor control component across the plurality of ribs and the plurality of web areas.

* * * * *